May 7, 1935.  A. E. KROGH  2,000,235
AUTOMATIC CONTROL
Filed April 24, 1931   10 Sheets-Sheet 8
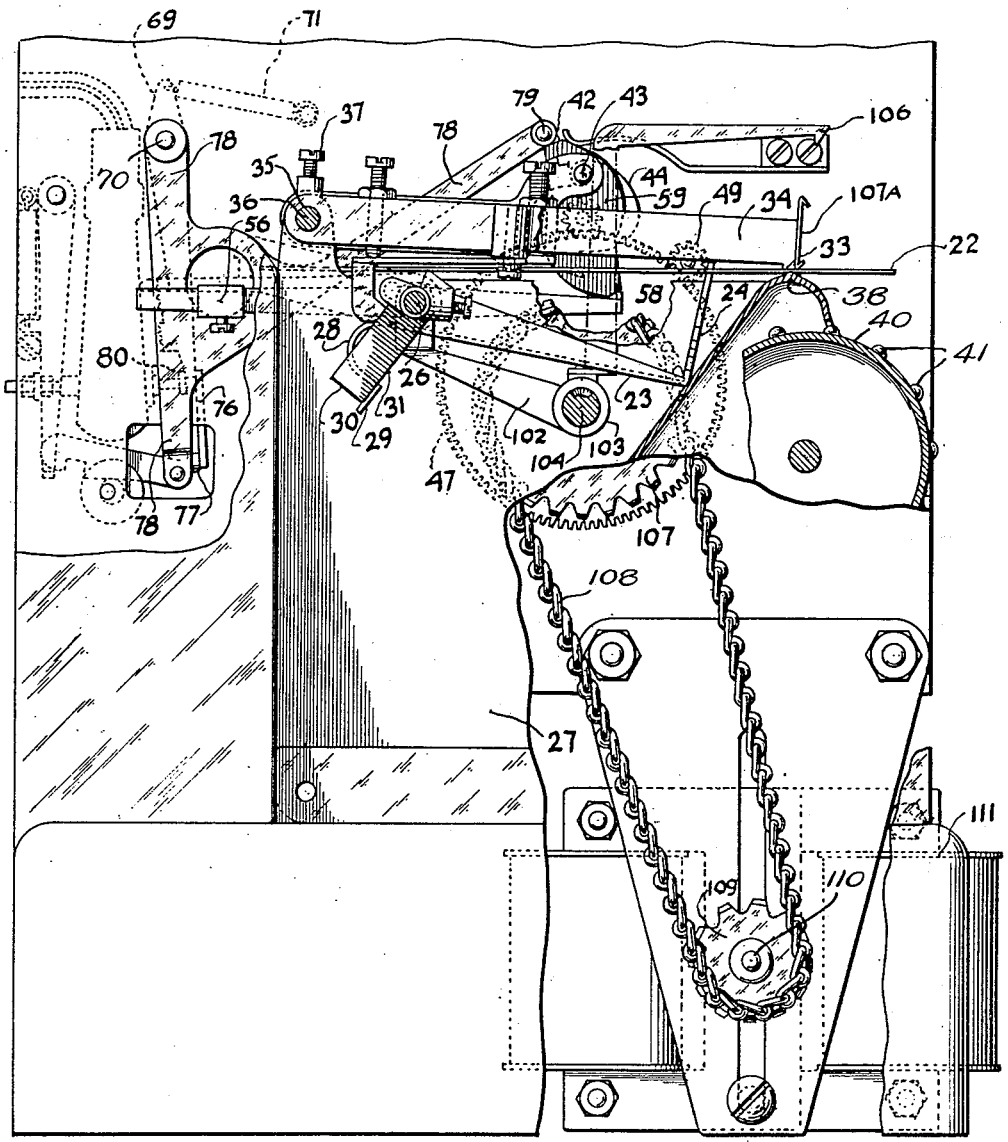
FIG. IX.
INVENTOR.
Anker E. Krogh,
BY Louis J. McBane
ATTORNEYS.

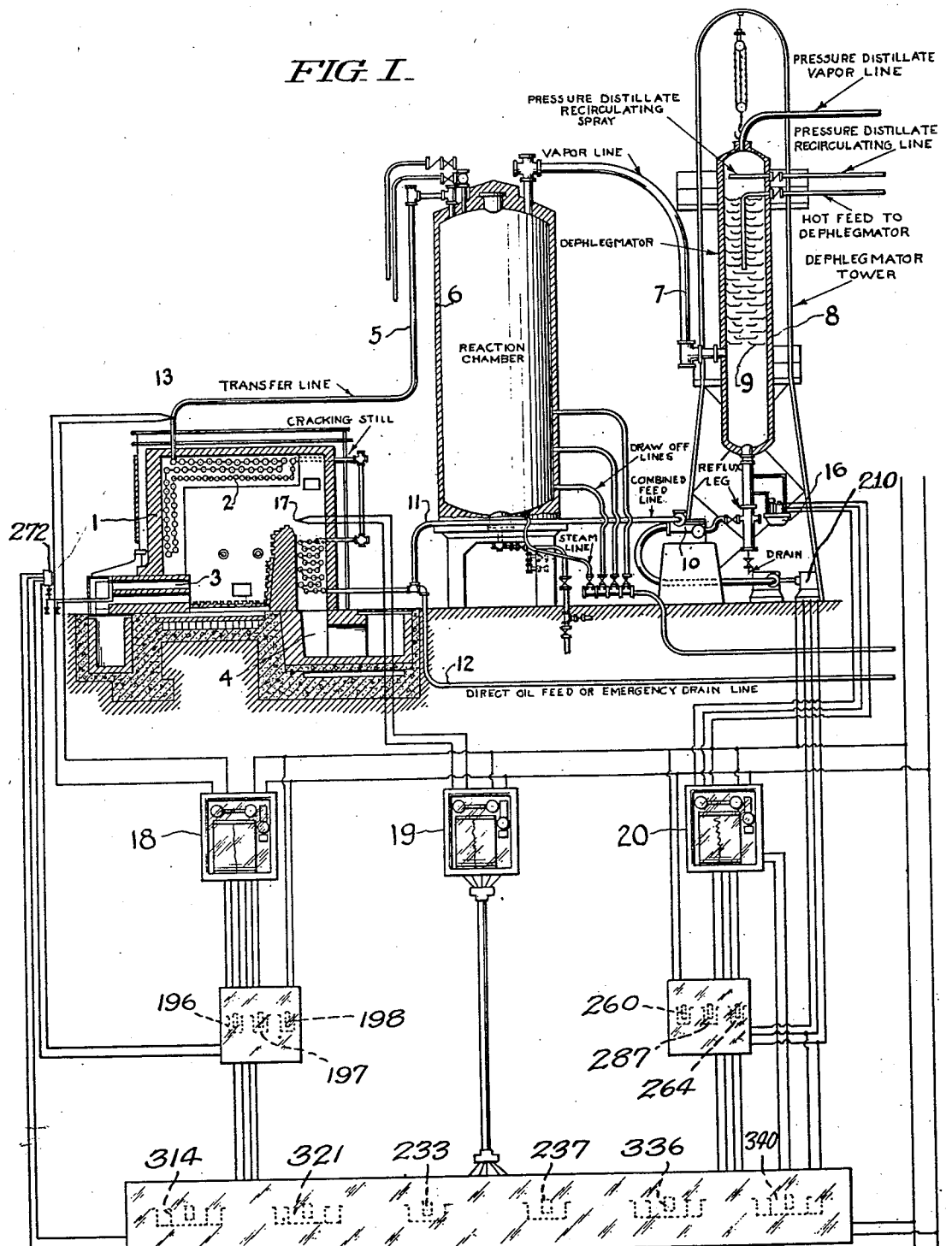

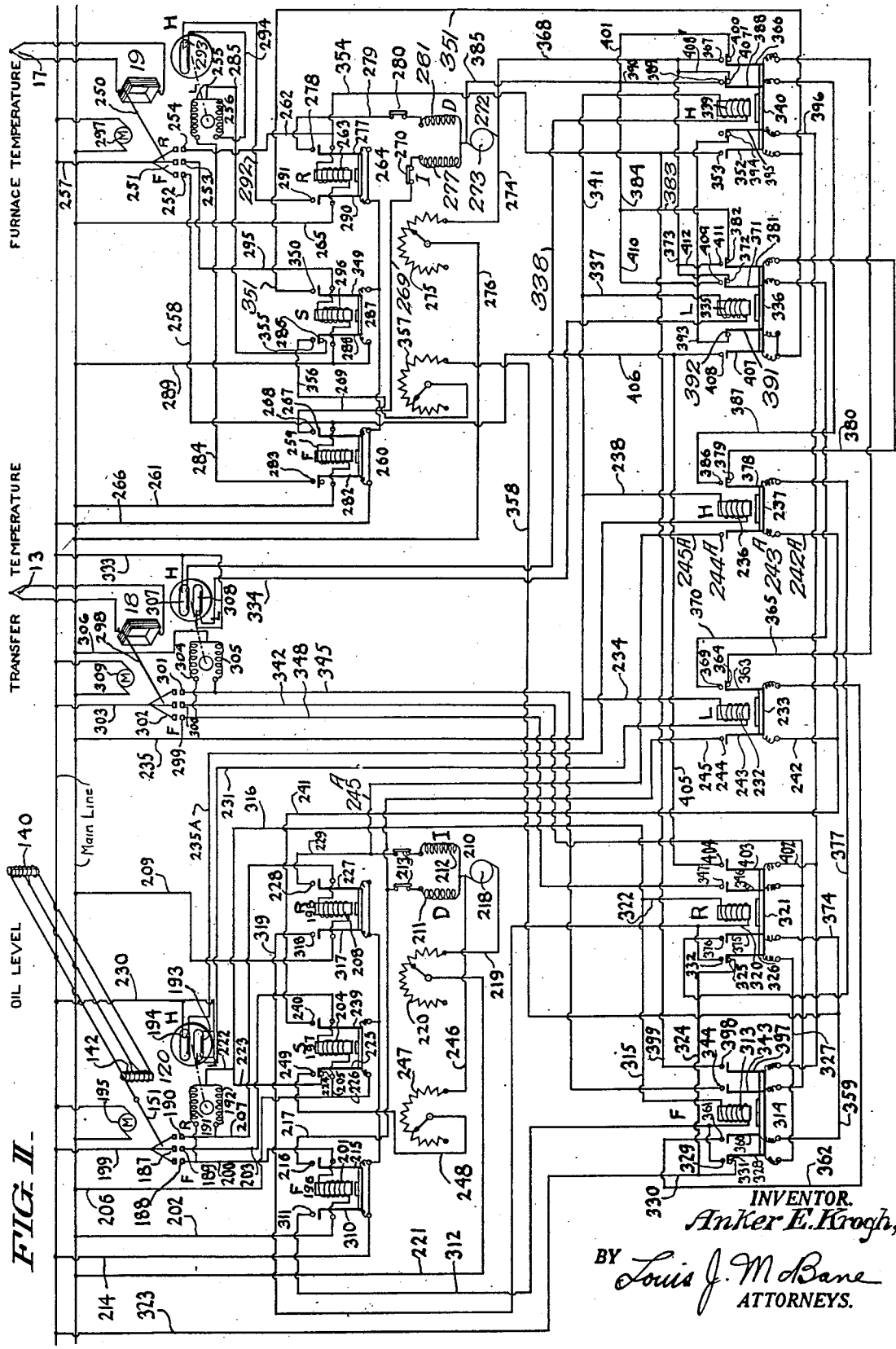
FIG II.

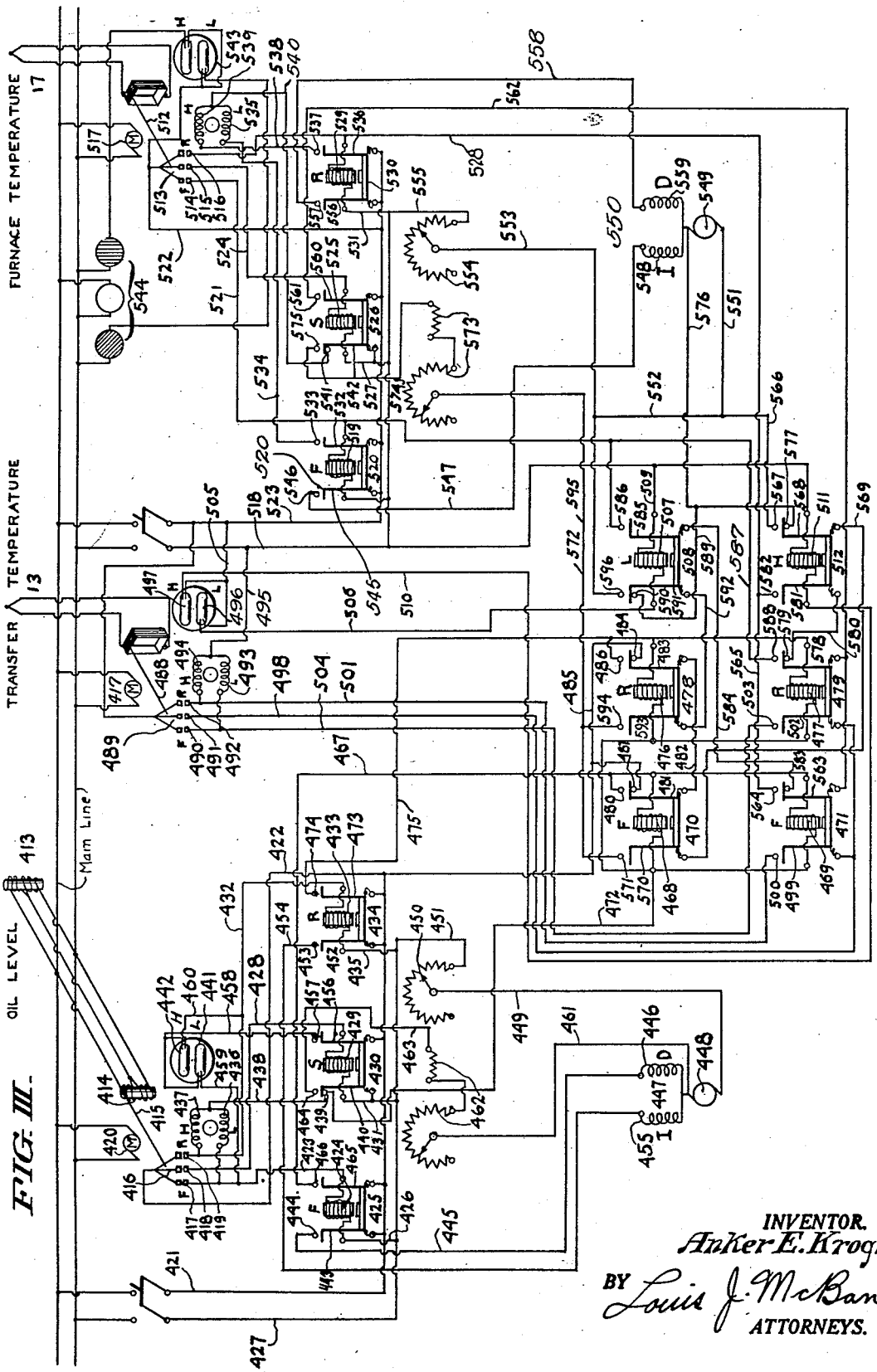

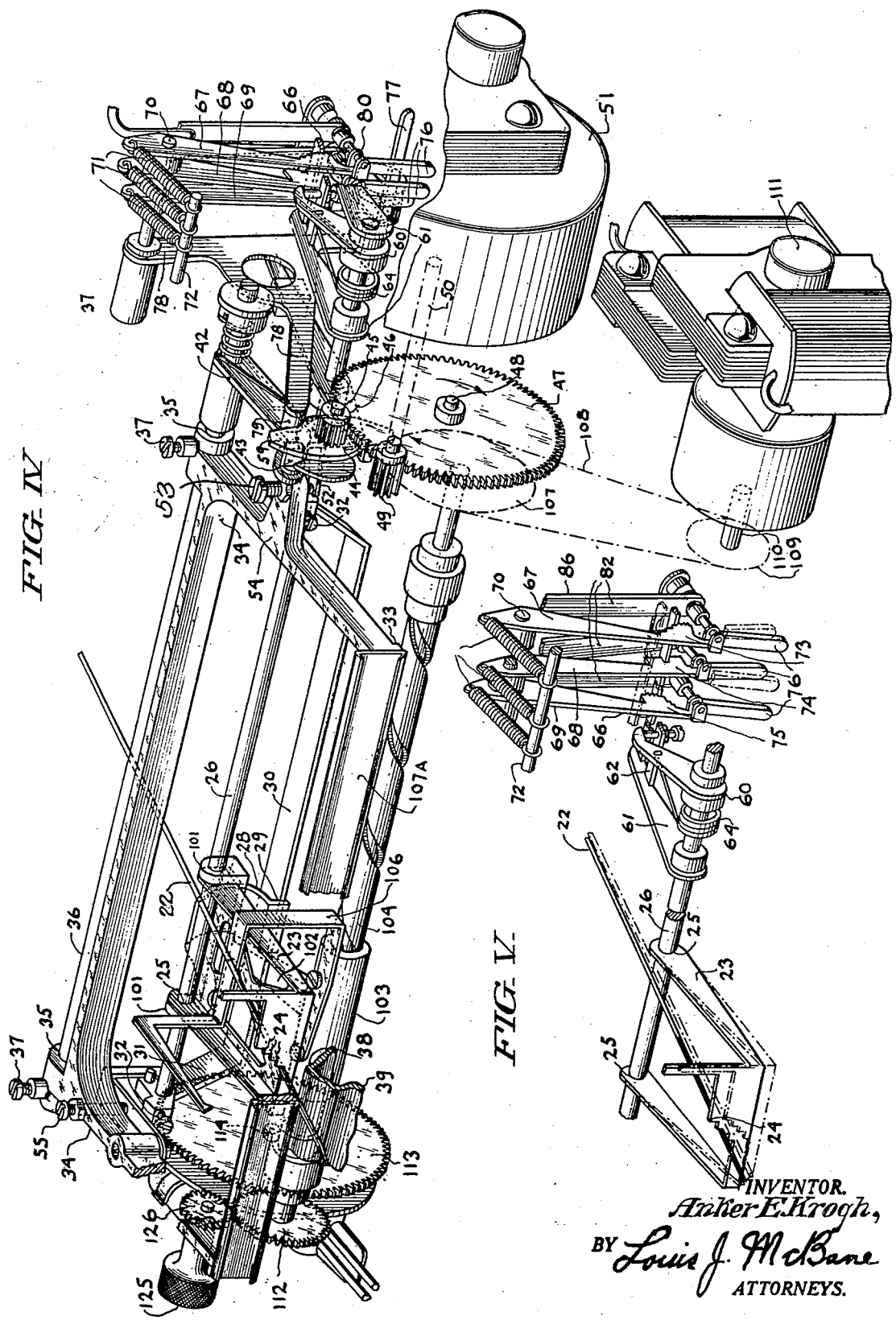

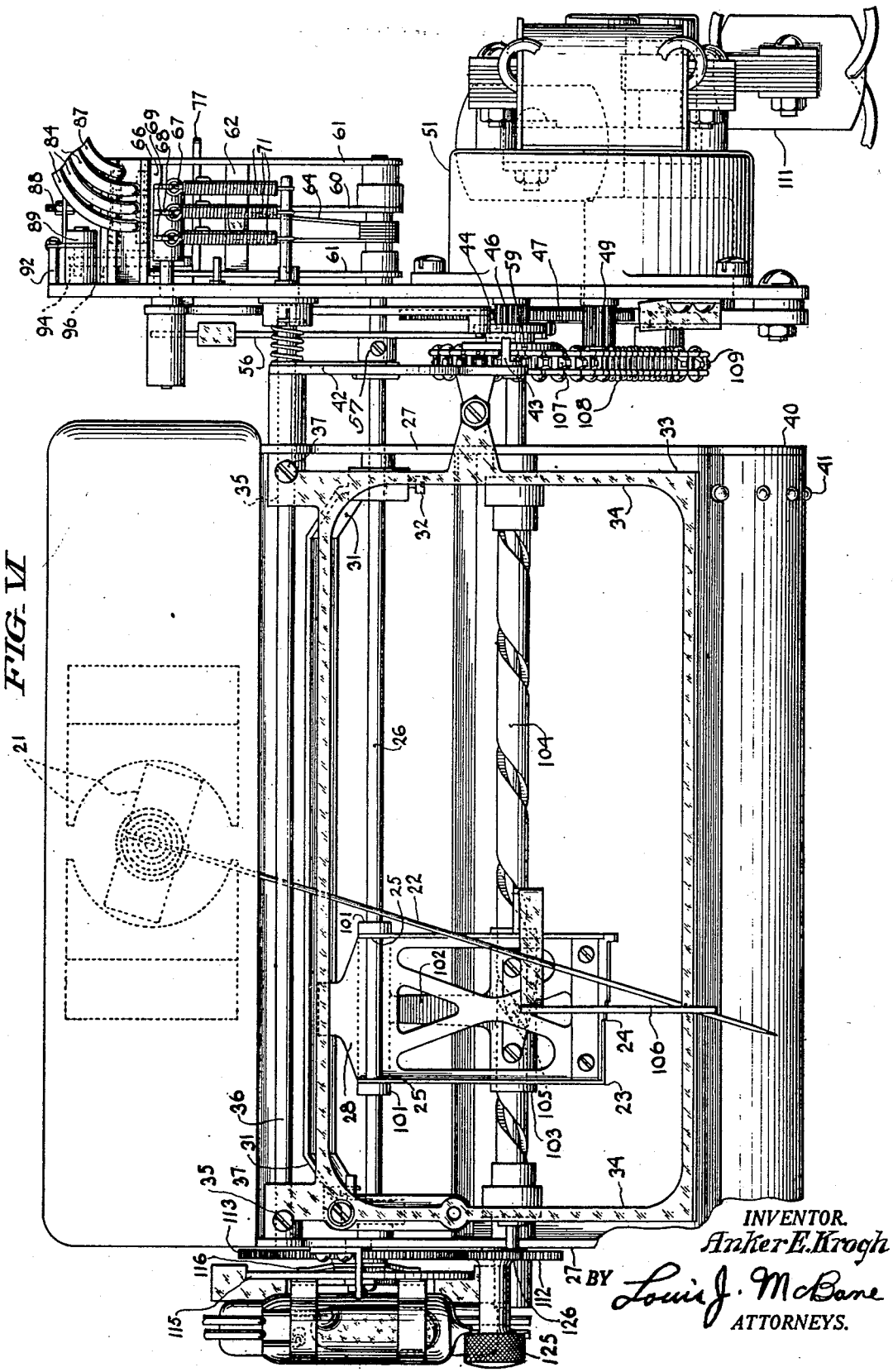

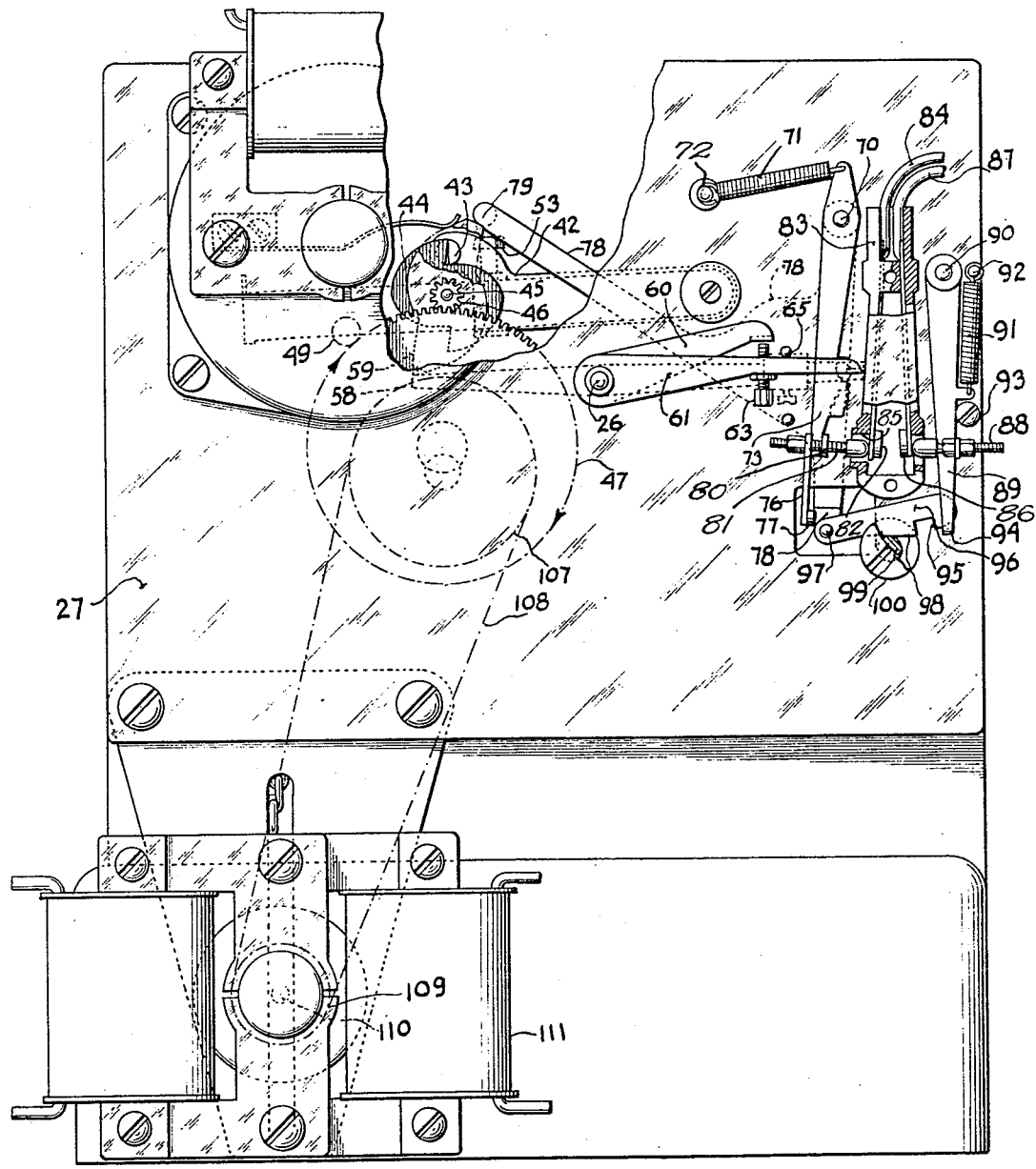
FIG. VII.

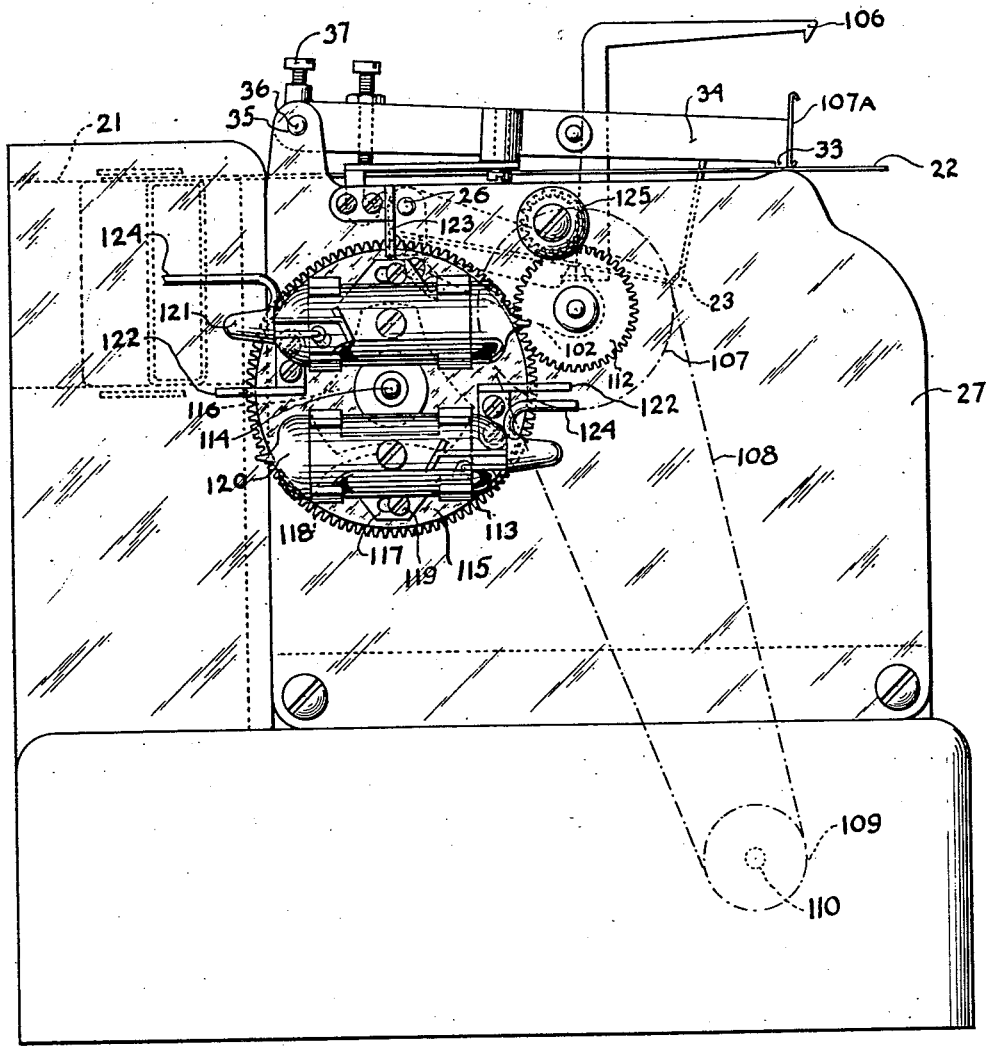
FIG. VIII.

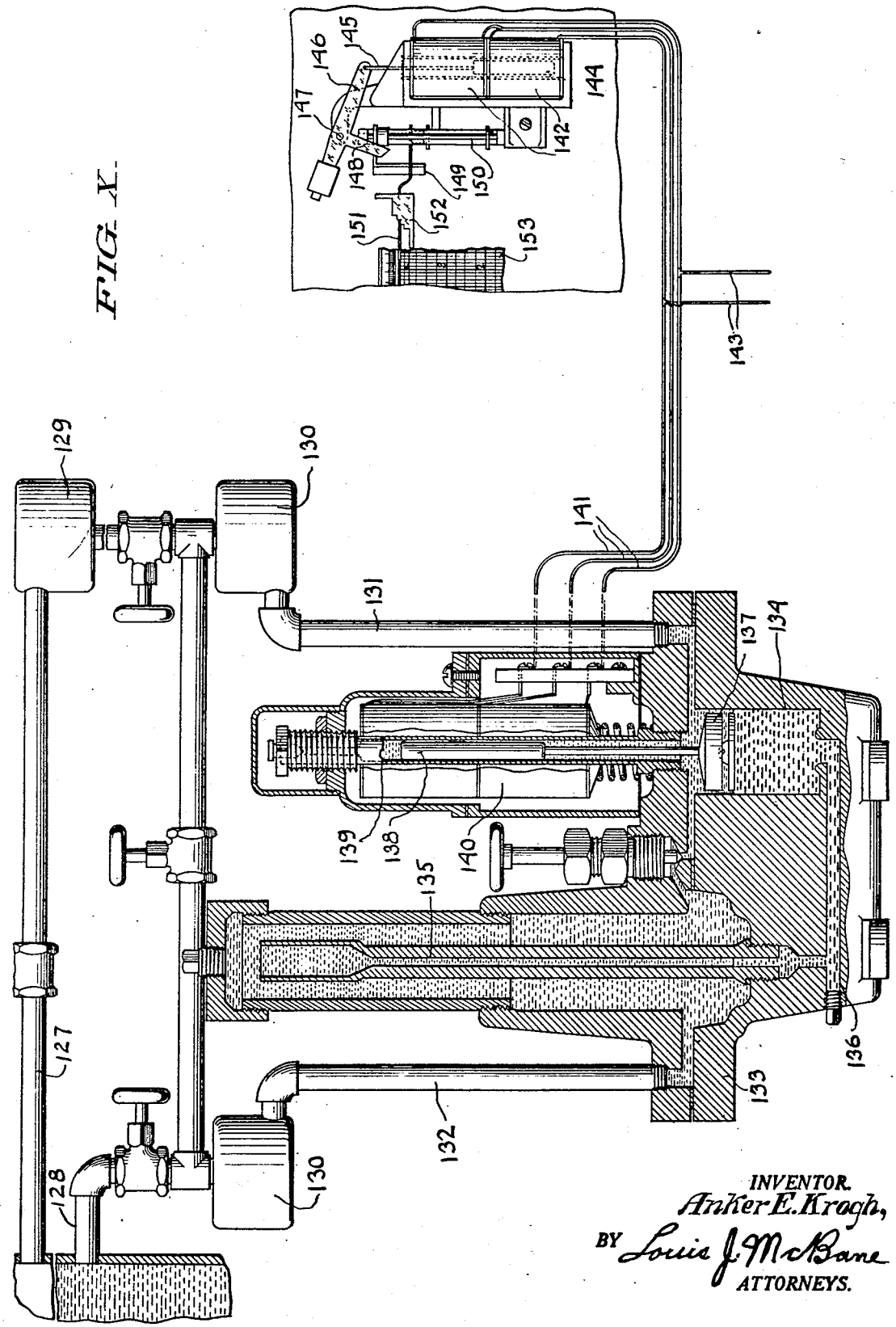

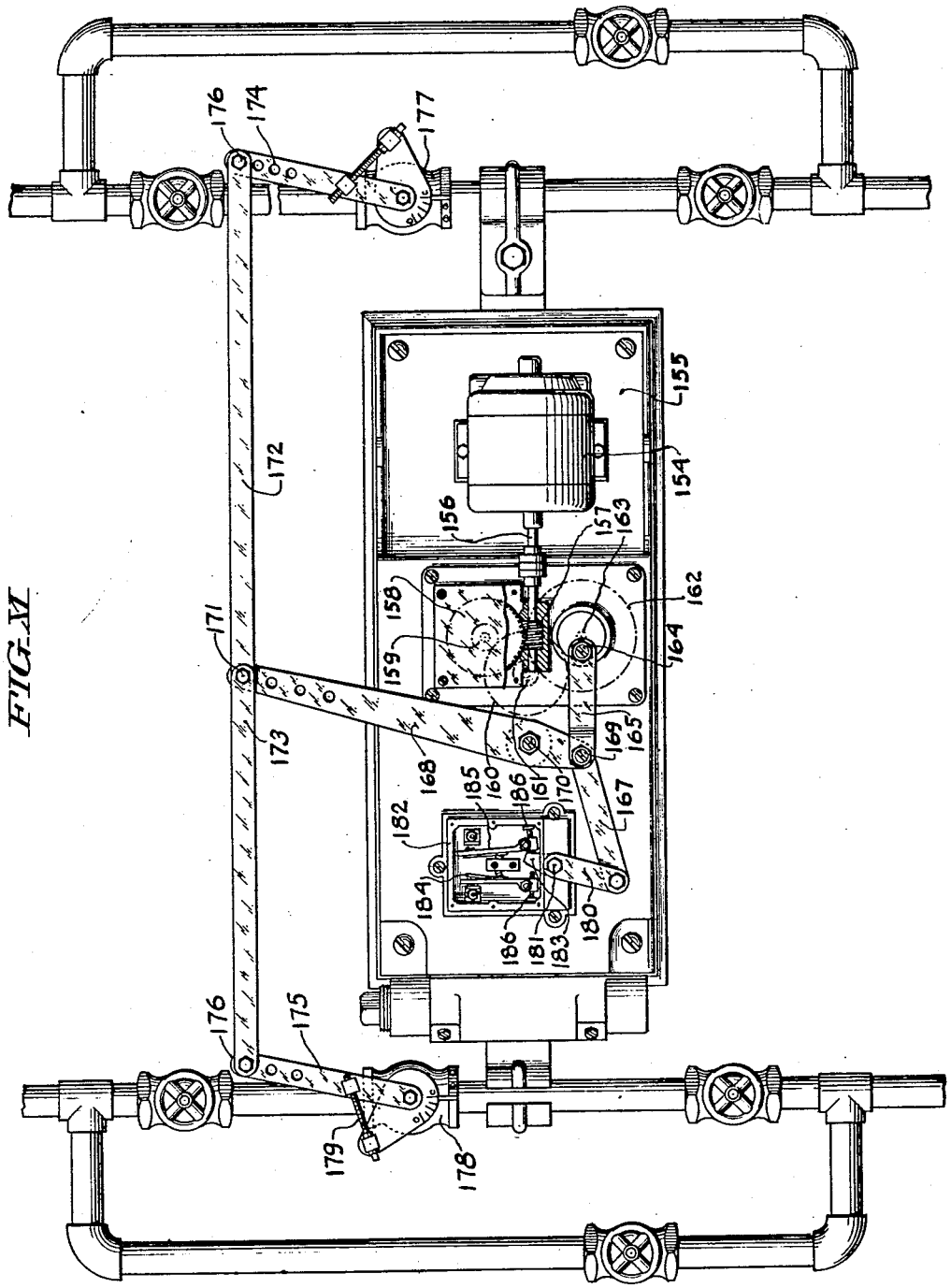

Patented May 7, 1935

2,000,235

UNITED STATES PATENT OFFICE 2,000,235

AUTOMATIC CONTROL

Anker E. Krogh, Philadelphia, Pa., assignor to The Brown Instrument Company, Philadelphia, Pa., a corporation of Pennsylvania Application April 24, 1931, Serial No. 532,668

56 Claims. (Cl. 196—132)

This invention relates to an automatic control system and more particularly to an automatic control system for operating an oil cracking unit.

The characteristics of an automatic control system are determined by the operating characteristics of the system to be controlled. In the simplest type of apparatus used for carrying out any kind of processing, the automatic control which is to be effected may be of one variable condition such as temperature, pressure, speed, or the like to be held to a predetermined schedule, and there is one condition which may be adjusted at will and which is so related to the variable to be maintained on schedule that by variation of the regulatable condition, the variable may be adjusted to maintain it on the predetermined schedule. For example, the heat supply may be adjusted to maintain a temperature, or the speed of a pump may be adjusted to maintain a pressure, or the steam supply may be adjusted to vary the speed of an engine. In such a simple system under control, accidental variations in the variable quantity which it is desired to hold to the schedule, are compensated for by regulation of the single condition. Likewise, accidental variations in the status of the regulatable condition affect the variable quantity correspondingly and cause a readjustment of the regulatable condition to maintain the variation to schedule. In such systems the inertia of the regulatable condition, the time lag or process lag existing between the variable and the regulatable condition, and the extent and rate of accidental variations of both the variable and the regulatable condition, are the essential factors in determining the design and operating characteristics of the control system. Automatic control systems for such simple processing apparatus are well known.

The problem of controlling a processing apparatus automatically is greatly complicated by the multiplication of either the number of variables to be maintained on schedule, or the number of regulatable conditions available. In industrial processes involving more than one of either variable condition to be held to schedule, or a regulatable condition to be adjusted, there are, in addition to the factors which determine the design and apparatus of the control system above pointed out, the following factors to be taken into consideration. Where two ultimate variables are to be held to schedule there usually is a relation between ultimate variables such that accidental variations in one cause changes in the other, and such that when adjustment is made through a regulatable condition to bring one or the other of the ultimate variables back to schedule, the effect of the adjustment upon both of the ultimate variables must be considered and attention must be given to the inertia effects and time lags involved between the effect that the adjustment of a regulatable variable has on both or all of the ultimate variables, and also the effect that any one of the ultimate variables has upon the others. Furthermore, one or both of the variables ultimately to be held to schedule may, when accidentally or intentionally varied, have a corresponding effect upon a regulatable condition, which effect upon the regulatable condition in turn affects one or more of the variables ultimately to be held to schedule.

In still other cases the number of regulatable conditions which are used, may be two or more, and may affect a variable condition ultimately to be controlled to different degrees, with different time lags, and in different directions, and at different rates. Also in such cases the ultimate variable may, when changed, affect either one, or both, or all of the regulatable conditions.

In still other cases the number of variable conditions ultimately to be controlled to schedule, and the number of regulatable conditions which it is necessary to adjust, may both be two or more, with the attendant possibilities of the variable conditions affecting one another and affecting the regulatable conditions of the regulatable conditions affecting one another, and of various of the regulatable conditions affecting various of the variable conditions ultimately to be held to schedule in various combinations. It is to systems for carrying out industrial processes involving a complex combination of variable conditions ultimately to be maintained to schedule and regulatable conditions which are interrelated casually, that this invention pertains. In the specific form of processing apparatus which serves to illustrate this invention, two regulatable conditions and three measured conditions are involved, there being a complex interaction between the various conditions measured and the regulatable conditions which takes place in various combinations in sequence, but the invention is not limited to a particular number of measured or regulatable conditions, nor to the particular combination and sequence of operations involved in the particular system hereunder described.

While the invention in its broadest aspects is not limited to the particular illustration hereunder described, yet the application of the principles of the invention to the particular form of processing apparatus, namely, a system for cracking oil, involves various combinations and arrangements specifically new and useful that constitute part of this invention.

The specific objects and advantages of the present invention will be made apparent in the following detailed description when taken in connection with the accompanying drawings, in which Fig. 1 is a diagrammatic view of a portion of an oil cracking processing apparatus having an automatic control system embodying the principles of this invention applied thereto.

Fig. 2 is a schematic view showing the manner in which the component parts of the automatic control system are interrelated.

Fig. 3 is a view similar to Fig. 2, showing the component parts of the automatic control system combined and operating in another way.

Figures 4, 5, 6, 7, 8, and 9 are views in perspective, top plan, elevation, and cross section of an automatic control pyrometer, which forms one of the component parts of the automatic control system of this invention.

Fig. 10 is a diagrammatic view partly in section, of a liquid level gauge, which forms another component part of the system of this invention.

Fig. 11 is a view in plan of a motor driven valve control unit which forms another component part of the system herein described by way of illustration of this invention.

Referring to Fig. 1, there is shown a furnace 1 designed to supply heat to tubes 2, through which oil to be cracked is passed continuously. The heat supply is created by burning oil injected through passages 3 into the combustion chamber of the furnace, the products of combustion being conveyed away through flues 4, the heat being transferred to the tubes and oil contained therein by direct contact with the gaseous products of combustion and also by heat radiated from the combustion chamber through the tubes along the top and the front walls of the furnace. The heated oil is conveyed from the furnace through the transfer line pipe 5 and fed into the reaction chamber 6 near the top thereof. Due to the large increase in temperature of the oil passing through the tubes within the furnace, the pressure upon the oil is necessarily high so that the oil flowing into the reaction chamber is under high pressure and at a high temperature. The reaction chamber is partially filled with the residue from the previous continuous operation of the system which may be drawn off from time to time through the draw-off lines shown. The oil under high pressure and at a high temperature when conducted to the reaction chamber, expands and vaporizes, and the process of cracking takes place or is completed. The vapors resulting from the cracking, which compose the hydrocarbon constituents of low boiling point, are conducted from the reaction chamber through the vapor line 7, and the residue consisting mainly of those hydrocarbons which are of high boiling point, settle in liquid form in the bottom of the reaction chamber from which they may be drawn off as conditions require.

The vapors conveyed from the reaction chamber through the vapor line 7 are led into the dephlegmator tower 8 at the lower portion thereof and the vapors flow upwardly through the dephlegmator tower bubbling through and passing over the condensate in the trays 9 and being subjected to a spray of pressure distillate which is recirculated through the cracking system again. Raw, hot oil is fed into the dephlegmator and flows over and through the trays 9. By so treating the vapors from the reaction chamber to a condensing and absorption process, a separation of the lower boiling point fraction from the higher boiling point fraction is obtained, the vapor composed of the hydrocarbons of low boiling point eventually finding its way out through the top of the dephlegmator and is conveyed through the pressure distillate vapor line to a suitable condensing unit. That part of the vapor fed to the dephlegmator tower from the reaction chamber, which consists of the hydrocarbons of high boiling point, is condensed and absorbed by the supply of raw hot oil carried in the trays 9. To effect an accurate separation of the hydrocarbons of low boiling point, the temperature within the dephlegmator tower is maintained constant, or such that the temperature of the vapors flowing from the top of the tower is constant, by a suitable temperature regulator (not shown) measuring the temperature in question and adjusting either the feed through the pressure distillate recirculating line, or the feed of raw hot oil through the dephlegmator tower.

The mixture composed of the raw hot oil fed into the dephlegmator, and the condensate from the vapors from the cracking process, passes to the bottom of the dephlegmator tower and into the reflux leg. A pump 10 draws the hot oil from the reflux leg and feeds it through line 11 into the tubes 2 within the furnace. Another oil feed line 12 is provided for supplying oil to the tubes 2. The supply of oil to the tubes 2 may be either in part or wholly through the line 11 from the dephlegmator tower.

In the operation of an oil cracking unit, such as is partially shown in Fig. 1, the maximum amount of certain constituents, such as gasolene, are sought for. In order to obtain such an operating condition, it is necessary that the reaction in the reaction chamber proceed as completely as possible to the production of the desired hydrocarbons. The reaction is controlled chiefly by the temperature and the pressure of the oil reacting, therefore it is essential that the oil fed into the reaction chamber from the cracking still be at a certain preedtermined temperature. At a given temperature the pressure of the oil is substantially constant, being dependent essentially upon the temperature, although the pressure and composition of the oil being fed through the tubes is a factor and the pressure in the reaction chamber are factors affecting the pressure of the oil as it issues from the transfer line. Accordingly, one of the variable conditions to be held to a predetermined schedule in this particular system chosen to illustrate the invention, is the temperature of the oil in the tubes as it issues from the cracking still, and a convenient and practicable temperature measuring device is a thermocouple 13 inserted in the oil line at that point.

The temperature of the oil issuing from the cracking still depends upon the amount of heat transferred to the oil, upon the rate at which the oil is advanced through the tubes, and upon the heat capacity of the oil. Of those conditions which affect the temperature of the oil issuing from the cracking still, the heat transfer to the oil and the rate of oil flow, are possible of variation. Accordingly, the supply of combustible to the furnace is adjustable through a valve controlled by motor 272 which adjusts the valve opening in the gas or oil fuel feed line to change the heat supply and therefore the heat transfer to the oil. Inasmuch as the furnace is inherently of large thermal capacity, and the volume of oil heated is large, changes in the fuel supply produce a resulting change in heat transfer slowly, and the resulting change in heat transfer slowly affects the exit oil temperature, therefore a large time lag exists between variations in fuel supply and corresponding variations in exit oil temperature. The maximum fuel supply is limited by the capacity of the furnace structure and tube structure to resist burning out. Also, the furnace itself is subject to changes which affect the heat transfer; for instance, the changes in outside temperature from season to season and from day to day. The quality of the fuel may vary. The tubes through which the oil passes, gradually accumulate a deposit of coke or carbon on their inner surfaces which also affects the heat transferred to the oil. Therefore, it is apparent that due to accidental variations a given opening of the valve controlled by motor 272 does not correspond to a certain heat transfer to the oil. In view of the time lag which exists between changes in heat supply and changes in exit oil temperature, the heat supply might change greatly before the exit oil temperature registered that change and so a wide fluctuation in exit oil temperature would ensue because of the large variation in heat supply. In order to reach the cause of such variations in exit oil temperature, it is desirable and practicably useful to measure the intensity of the heat supply, namely the combustion chamber temperature, and to also adjust the valve controlled by motor 272 so as to maintain a steady combustion chamber temperature despite accidental variations in heat supply.

The temperature of the exit oil may also be varied and therefore held to a predetermined schedule by adjusting the rate of supply of oil through the tubes, and accordingly a control motor 210 is provided for adjusting the steam valve to vary the supply of steam to the pump 10, and therefore the rate of supply of oil through tube 11. However, the oil passing through conduit 11 is taken from the reflux leg or the bottom of the dephlegmator tower. Obviously the rate at which the oil is drawn from the tower must not be so great as to exhaust the reflux leg thereby causing a cessation of oil flow from that source to the tubes. On the other hand, the level of oil in the bottom of the dephlegmator tower must be kept within certain maximum limits in order that the dephlegmator may operate efficiently. The supply of oil in the bottom of the dephlegmator tower is affected by the rate of supply of raw hot oil into the top of the dephlegmator, by the rate of supply of pressure distillate from the recirculating line, by the rate of supply of the vapor from the reaction chamber, and by the proportion of condensate separated out from the vapors entering the dephlegmator from the reaction chamber. It is apparent, therefore, that the quantity of oil in the bottom of the dephlegmator tower is subject to accidental variations from many sources. Accordingly, the rate at which oil is drawn from the bottom of the dephlegmator must be adjusted to take care of changes in level of the oil in the dephlegmator tower, and at the same time to allow for the effect of a change in oil supply to the cracking still upon the exit oil temperature. Accordingly, a liquid level gauge 16 is connected with the bottom of the dephlegmator tower or with the reflux leg and measures oil level therein.

The reaction by which heavy hydrocarbons are cracked to form lighter hydrocarbons depends both upon temperature and the length of time that the oil is maintained at the temperature in question. Accordingly, changes in heat supply to the oil in passing through the tubes 2 in the cracking still, and changes in the rate of supply of oil through the tubes of the cracking still, affect the cracking reaction and therefore affect the proportion of condensate which is separated from the hydrocarbons of low boiling point in the dephlegmator tower.

Thus it is seen that there is in the particular processing apparatus, partially shown in Fig. 1, and described as illustrating this invention, a plurality of conditions, some of which are to be held to predetermined schedules or within predetermined limits, and some of which may be regulated subject to certain operating conditions, all of which are interdependent in various combinations, and in order to control automatically such an industrial process it is necessary to take into consideration the status of the various conditions involved and their tendencies to vary accidentally, and their tendencies to affect one another in various combinations. Thus the transfer line oil temperature depends proximately upon the heat supply to the oil passing through the cracking still and upon the oil supply through the tubes of the cracking still, and also upon accidental variations such as changes in oil quality. The level of liquid in the bottom of the dephlegmator tower depends proximately upon the rate of oil supply from the dephlegmator to the cracking still, upon the supply of vapor from the reaction chamber to the dephlegmator tower, upon the feed of raw hot oil to the dephlegmator, upon the feed of pressure distillate from the recirculating line, upon the extent to which cracking takes place, and upon many accidental factors. In turn, the supply of vapor through the dephlegmator depends upon the transfer line temperature and rate of oil supply through the cracking still. The proportion of condensate from the vapor passing through the dephlegmator tower depends upon the temperature within the dephlegmator tower. The degree to which the cracking proceeds, depends upon the transfer line temperature and the rate of oil supply, and the rate of heat supply. In addition, the combustion chamber temperature, which is indicative of heat supply, depends upon the rate of fuel supply, quality of fuel supply, changes in ambient conditions, and many other accidentally variable conditions. The heat transferred to the oil depends upon the condition of the tubes and the condition of the furnace. It is apparent, therefore, that the whole system is one of the interlocked and interrelating conditions, none of which can be considered independent of the other for purposes of automatic control.

The temperature measuring devices, namely, thermocouples 13 and 17 for measuring the exit oil temperature and the combustion chamber temperature respectively, operate pyrometers 18 and 19 provided with suitable control mechanism. Liquid level gauge 16 operates a control instrument 20.

Pyrometers 18 and 19 are each provided with a galvanometer 21 actuated by the electromotive force generated by the respective thermocouples, and provided with a pointer 22. (See Figures 4 to 9 inclusive). The pointer 22 follows by changes of position the changes of electromotive force of the thermocouple and therefore changes of the temperatures measured. Due to the large number of factors which affect and tend to cause variations in the measured conditions, and also to the large time lags and inertia effects involved in regulating the system to maintain the measured quantities on schedule, the rate at which the measured quantities vary from schedule may be either small or large in either direction. It is desirable therefore and practically necessary to provide a control pyrometer and control liquid level gauge, that is, considering the invention broadly, control instruments of any nature, which in their operation determine the rate of variation of the measured condition and have the capacity to effect regulating actions which are in accordance with the rate and direction of change of the measured quantity. Such regulating actions of the control instruments in accordance with rate and direction of change of measured condition may, as circumstances require, be made independently of any predetermined neutral or predetermined schedule; or, on the other hand, such control actions may be made with allowance for and in addition to control action dependent upon and made in accordance with the extent of departure of the measured condition from a predetermined schedule or normal. The necessity of maintaining the exit oil temperature, for example, to an exact predetermined schedule, makes necessary the provision of control action by the control instruments which tends always to bring the measured condition back to the predetermined schedule, and therefore must be in accordance with the direction of departure of the condition from schedule and may be in accordance with the extent of that departure. Likewise, the maintenance of the level of liquid within the dephlegmator tower within broad limits, makes necessary the provision of a control action which tends to restore the measured condition to a predetermined normal, although in the case of the liquid level the maintenance of the level at an exact point is not so important as preventing the change in level from taking place too rapidly. Accordingly, the apportionment of control action or strength between that tending to return the measured condition to schedule and control action made in accordance with the rate of change of the control condition, may be different in different cases.

In order to gauge the rate of change of measured condition, a step table 23 having steps 24 arranged to engage the pointer 22, is provided. Step table 23 is provided with apertures 25 through which shaft 26 passes, the step table being free to rotate upon the shaft 26, the shaft 26 being journalled for rotation in the side plates 27 of the instrument. The step table 23 is provided with a tail 28 extending downwardly from the table and having a lip 29 engageable by a bar 30. The bar 30 has laterally extending arms 31 provided with apertures through which the shaft 26 extends. Set screws 32 pass through the apertured ends of arms 31, securing the bar 30 to the shaft 26 for rotation therewith. Rotation of the shaft 26 operates through bar 30 to turn the step table 23 around the axis of the shaft 26 into pointer engaging position.

In order to hold the pointer from movement when it is engaged by the step table 23, provision is made for clamping the pointer prior to the engagement of the step table with the pointer, the clamping action being made adjacent the step table so as to support the pointer under the load of the step table. For clamping the pointer there is provided a depressor bar 33 which extends across and over the path of movement of the pointer 22. The depressor bar is supported by arms 34 which may be integral therewith and which are apertured as indicated at 35, through which apertures a shaft 36 passes, the shaft 36 and arms 34 being secured together by set screws 37. Rotation of the shaft 36 effects the oscillation of the depressor bar 33 into and out of engagement with the pointer 22. When lowered, the depressor bar clamps the pointer between it and a suitable supporting surface beneath the pointer extending in line with the depressor bar 33. Such a surface is formed by the ridge or anvil-like formation 38 in the sheet metal guide 39 which extends across the front of the instrument and is supported at its ends in the side plate 27 of the instrument.

When it is desired to make a record of the measured condition, a chart (see Fig. 10) is positioned over the sheet metal guide 39 and is advanced by a driven roller 40 provided with studs 41 for engaging in apertures at the margins of the chart paper, the chart paper being drawn from any suitable source of supply and the roller 40 being operated from a suitable source of power. In such cases a ribbon, such as a typewriter ribbon or a ribbon of carbon paper (not shown) is positioned beneath the pointer 22 and over the chart paper and above the ridge or anvil 38 so that upon depression of the pointer 22 by the depressor bar 33, a mark is made at the intersection of the pointer 22 with the anvil 38, the mark being made upon the paper through the ribbon. The operation of the instrument as a controller is in no way dependent upon a record of the conditions measured.

Provision for oscillating the depressor bar periodically are as follows. The crank arm 42 is journalled for free rotation upon shaft 36 and is provided with a cam follower 43 which rides upon cam 44 secured upon shaft 45, journalled in the frame plate, for rotation therewith. A pinion 46 is fixed upon shaft 45 and is driven by spur gear 47 in mesh therewith. Spur gear 47 is journalled for rotation upon stud shaft 48 fixed in an end plate of the instrument. Spur gear 47 is driven by pinion 49 rigid with the shaft 50 of motor 51. The motor may be and conveniently is a standard electric clock motor, and suitable gearing (not shown) between the shaft 50 and the armature of the motor 51 may be provided. The continuous rotation of the motor 51 operates through the gear train 49, 47 and 46 to rotate cam 44 in a counterclockwise direction, as viewed in Fig. 7. Rotation of the cam 44 oscillates the crank arm 42 about shaft 36. Crank arm 42 is provided with a laterally extending finger 52 which engages with a set screw 53 threaded in lug 54 integral with arm 34 of the depressor bar. The crank arm 42 through finger 52 lifts the depressor bar 33 to free the pointer 22. As the rotation of the cam 44 continues, the cam follower 43 falls from a high point to a low point on the cam 34, as shown in the various Figures 4, 7 and 9, thereby permitting the depressor bar 33 to drop and clamp the pointer between it and the sheet metal guide 39. The extent of movement downwardly of the depressor bar is limited by set screw 55 threaded into an arm 34 of the depressor bar and engaging with the frame of the machine.

The pointer while held in position, is then engaged by the step table 23, the movement of which is effected by rotation of bar 30 carried rigidly by a shaft 26. In order to effect the oscillation of shaft 26 and thereby the oscillation of step table 23, the shaft 26 is provided with a rocker arm 56 that carries an adjustable weight for balancing the movable system. The rocker arm 56 is secured to the shaft 26 by set screw 57 threaded into a collar carried by the rocker arm. The rocker arm 56 is provided at one extremity with a cam follower 58 which rides upon the surface of cam 59. Cam 59 is fixed rigidly upon the shaft 45 and is driven in rotation along with and by the same means as cam 44. In the position of the cycle of operation in which the mechanism is illustrated in Figures 8 and 9, the cam follower 58 is at the high point of the cam 59, and accordingly the shaft 26 is held in an angular position such that the table 23 is depressed. Fig. 4 shows the mechanism at a slightly later stage in the cycle of operation where the cam 59 has rotated further, just sufficiently to allow the cam follower 58 to drop from the high point to the low point of cam 59, at which time the shaft 26 is moved into such an angular position as, through bar 30 and tail lip 29, to lift the table 23 into engagement with the pointer. The cams 59 and 44 are so positioned upon their common shaft 45 that the cam follower 43 is allowed to drop from the high point to the low point of cam 44 slightly before the cam follower 58 drops from the high point to the low point of cam 59, so that the depressor bar 33 is lowered to clamp the pointer 22 just prior to the elevation of step table 23 to engage the pointer 22.

The step table 23 is provided with a plurality of steps 24 any one of which may engage the pointer when the table 23 is raised, the particular step which contacts with the pointer 22 being determined by the relative positions of the pointer 22 and the table 23. When the steps 24 engaged by the pointer are uniform and are arranged in an inclined series as are the central steps shown in Figs. 4 and 5, the extent to which the table 23 is raised to engage the pointer will vary in accordance with the extent of the pointer deflection relative to the table 23, therefore the extent of elevation of the table 23 to engage pointer 22 is a measure of the extent of deflection of the pointer 22 relative to the table and therefore a measure of the extent of variation of the condition being measured relative to the table 23 as a datum. When the operative steps of the contact table include but a single central horizontally elongated step and one high and one low horizontally elongated step at opposite sides of the central step as shown in Fig. 6, the extent of elevation of the table when in engagement with the pointer depends merely upon which of the three steps is in engagement with the pointer and not upon the position of the pointer within the appreciable range of pointer deflection in which the pointer may engage with each of the three steps.

Inasmuch as the bar 30 is held into contact with the tail lip 29 by the weight of the crank lever 56, the angular position of the shaft 26 corresponds to the extent to which the table 23 is raised when it is in engagement with the pointer 22. The cam follower 58 may or may not fall into contact with the low point of the cam 59 according to which of the steps of the step table 23 engage with the pointer 22.

The shaft 26 has an arm 60 rigidly secured thereto so that the angular position of the arm 60 corresponds to the elevation of the table 23 when the latter is in engagement with the pointer 22. A pair of selector arms 61 are journalled on shaft 26. A bar 62 extends between the selector arms 61 and a screw 63 is threaded through bar 62 in a position to be engaged by the end of arm 60, (see Fig. 7). A spring 64 (Fig. 6) coiled about the shaft 26 has its extremities connected with an arm 60 and with the bar 62 respectively. The spring 64 tends to urge the member made up of selector arm 61, cross bar 62, and screw 63, into a position such that the screw 63 engages with the extremity of the arm 60. When the selector table is in its lowermost position, and consequently the arm 60 is in its uppermost position, as shown in Fig. 7, and the selector arms 61 are free to rotate about the shaft 26, the spring 64 moves the arms 61 upwardly to their limit as determined by stop 65 fixed in the side plate of the instrument.

When the step table is caused to move into engagement with pointer 22, the arm 60 is rotated through an angle determined by which of the steps 24 engages pointer 22, and the selector arms 61 are likewise rotated through such an angle, the spring 64 serving to hold the screw 63 in contact with the end of arm 60 so that the selector arms 61 are caused to take up an angular position which is a measure of the deflection of pointer 22 relative to the table 23. The selector arms 61, by virtue of their relation to the step table 23, are used to effect control actions corresponding to deflections of the pointer 22. For that purpose the selector arms 61 carry between them a selector finger 66 which is arranged to be engaged by any one of a plurality of selector levers 67, 68, and 69, all of which are journalled by the shaft 70 fixed in the side plate of the instrument. Springs 71, each secured at one end to one of the levers 67, 68, and 69, and at its other end by a stud 72 fixed in the side plate of the instrument, tend to urge the levers 67, 68, and 69 in counterclockwise rotation, as viewed in Fig. 7, that is, into engagement with the selector finger 66.

Each of the selector levers 67, 68, and 69 is provided with a stepped projection 73, 74, and 75 respectively (see Fig. 5), arranged to engage the selector finger 66. When the selector finger 66 is moved into a position which corresponds to the center step of the step table 23 (such as shown in Fig. 5), the selector levers 67, 68, and 69, when operated, are caused to engage the selector finger and the stepped projections 73 and 75 engage the selector finger 66 at high points on their surfaces so that the selector levers 67 and 69 are held in outermost position, as shown in Fig. 5. However, the selector lever 68 is provided with a central notch which, when the selector finger 66 occupies such a position, fits over the selector finger and allows the selector lever 68 to move inwardly, as shown in full lines in Fig. 5.

When the pointer position is such that the table 23 must be moved to an uppermost position, or at least to a position corresponding to a step 24 below the neutral step, the shaft 26 is rotated through an angle greater than that shown in Fig. 5. Such a position of the mechanism is shown in Fig. 4. In that case the selector finger 66 is moved to a lower position than that of Fig. 4, and when the selector fingers 67, 68, and 69 are caused to move into engagement therewith, selector fingers 67 and 68 strike the selector finger 66 upon the high portions of their stepped projections so as to hold those step levers out of active position. Step lever 69, due to the conformation of its stepped projection 75, moves inwardly until it engages with the selector finger 66, the extent to which it moves inwardly being determined by which of the steps of the stepped projection 75 engages the selector finger 66, which in turn is determined by the position of the finger 66, which ultimately is determined by the position of the pointer 22 relative to table 23. Likewise, when the pointer 22 is engaged by one of the uppermost steps 24, as illustrated in dot and dash lines in Fig. 5, the selector finger 66 is moved into a position higher than the neutral position, as shown in dot and dash lines in Fig. 5. In such position, when the selector fingers 67, 68, and 69 are operated, fingers 68 and 69 are held out of active position by the engagement of the high portion of the stepped projection 74 with the finger 66, while the selector lever 67 moves into active position to an extent determined by the position of finger 66, because of the conformation of the stepped projection 73, as shown in dot and dash lines in Fig. 5. Thus a high, low, or neutral selector lever is moved into active position into a degree determined by the position of the pointer 22 relative to the table 23.

The selector levers 67, 68, and 69 are provided with tails 76 arranged to be engaged by finger 77 extending laterally from crank 78 journalled on shaft 70 (see Fig. 9). The crank 78 carries cam follower 79 which rides on cam 59. As the cam 59 rotates, the crank 78 is caused to oscillate about shaft 70 and to move finger 77 to and fro so as to oscillate selector levers 67, 68, and 69 about the shaft 70, the selector levers being moved out of engagement with the finger 66 at one end of the oscillation and being allowed to move into engagement with the finger 66 as the finger 77 moves in counterclockwise direction, as shown in Fig. 7. In Figures 6, 7, and 9 the cam follower 79 is shown on the high point of cam 59 and the finger 77 is shown in its position of maximum movement toward the left (Fig. 7), where its acts upon tails 76 to hold the selector levers 67, 68, and 69 out of engagement with finger 66. In Fig. 4 the cam follower 79 is shown just after it has passed the high point of the cam 59 and fallen into the low point of the cam in which position the finger 77 is moved to its outmost right hand position, allowing the selector levers 67, 68, and 69 to engage the finger 66. Cam follower 79 falls after cam follower 58 has fallen.

The selector levers 67, 68, and 69 have lugs 80 through which pins 81 are threaded. The heads or pins 81 are arranged to thrust against electric contacts 82 which are in the form of flat strips mounted in a block of insulating material 83 and connected with lead wires 84. The pins 81 project through apertures 85 in the block 83 to engage the contacts 82. Complementary and similar contacts 86 are likewise carried in the block 83 and connected with electrical leads 87. Contacts 82 and 86 form pairs, there being a pair corresponding to each of the selector arms 67, 68, and 69. When the selector levers 67, 68, and 69 are actuated and moved into contact with the selector finger 66, the correspondingg contacts 82 are moved to the right, as shown in Fig. 7, to an extent corresponding to the extent of rotation of the selector levers 67, 68, and 69. The contacts 86 are engaged by pins 88 adjustably secured to the rock lever 89 journalled for oscillation about stud 90 secured to the side plate of the instrument. A spring 91 secured to the rock lever 89 and to a stud 92, tends to rotate the rock lever 89 in a counterclockwise direction until stopped by pin 93. The rock lever 89 is provided with a tongue 94 arranged to be engaged by slot 95 in hook 96. The hook 96 is rotatably secured to the end of crank 78 by pin 97 and is provided with a cam surface 98 which rides over a pin 99 carried by eccentric 100 secured to the side plate of the instrument. Pins 81 and 88 and eccentric 100 may be adjusted as required to effect proper cooperation between the related parts.

When the crank 78 is moved to its outmost right hand position, as shown in Fig. 4, the cam surface 98 of hook 96 rides over the pin 99 so that the slot 95 latches with the tongue 94. Upon subsequent rotation of the cam 59 and consequent oscillation of crank 78, the hook 96, because of its latched engagement with tongue 94, rotates the rock lever 89 in a clockwise direction thereby acting through pins 88 to move contacts 86 to the left, as shown in Fig. 7, into engagement with that one of the contacts 82 which has previously been adjusted into active position by movement of one of the selector levers 67, 68, and 69, as determined by the position of selector finger 66 and ultimately by the position of pointer 22 relative to table 23.

Inasmuch as the direction and extent of the pointer movement relative to the table 23 determines the selection and degree of control action effected through the contacts 82 and 86, it is evident that for a single operation the control action is in accordance with the rate of change of the condition measured. In order that each cycle of operation of the controls may effect a control action which is in precise accordance with the direction and rate of change of measured condition, it is necessary that the immediately previous position of the pointer 22, when engaged by the table 23, be used as the datum from which to measure each succeeding position of the pointer 22 as determined by the operation of the step table 23. By so operating the instrument, the change of the measured condition from cycle to cycle of operation of the instrument, determined the control action and therefore the control action is in accordance with the direction and rate of change of the measured condition. In order to use the immediately previous position of the pointer when the step table engages it as a datum for the next gauging of the pointer position, it is necessary that the step table be adjused after each action of the table in gauging the position of the pointer so that the neutral step of the table 23 will occupy the position corresponding to that occupied by the pointer when the pointer position was last gauged by the step table. Accordingly, the step table is arranged for adjustment laterally, as viewed in Fig. 6, that is, in the direction of movement of the pointer 22. In order to adjust the table 23 laterally, a U-shaped bar 101, having its upturned ends apertured to receive the shaft 26, is positioned with the upturned ends in juxtaposition with the sides of step table 23, as shown in Figures 4 and 6. An extension 102 connects the U-shaped bar 101, with a sleeve 103 through the bore of which extends a spirally grooved shaft 104. The sleeve 103 carries a projection 105 which rides in the spirally grooved shaft 104. Rotation of the spirally grooved shaft 104 causes the sleeve 103 to move laterally and thereby shifts the U-shaped bar 101 laterally on shaft 26. The step table 23 is free to slide along shaft 26 and is carried in lateral movement with the U-shaped bar 101. A pointer 106 may be secured to the sleeve 103 for showing the position of the step table upon a scale plate carried in the channel 107A on the front of the depressor bar. The spiral shaft 104 is journalled in the end plates 27 of the instrument and carries a sprocket 107 over which is trained a chain 108 driven by sprocket 109 secured to the shaft 110 of reversible motor 111 which may be of a conventional type.

The motor 111 may be operated through any suitable electrical connections, later to be described, associated with the contacts 82 and 86, the direction of rotation of the motor 111 being determined by which of the selector levers 67 or 69 is moved into active position, and the extent of operation of the motor being determined by the selector finger 66 and accordingly by the deflection of pointer 22 relative to the neutral step of the step table 23. When the operative steps 24 of the table are each of a width practically equal to the thickness of the pointer 22 as shown in Figs. 4 and 5, the mechanism may be, and in some cases advantageously is adjusted so that the step table will be moved in a direction and by an amount such as to bring the neutral step of the step table 23 into the position last occupied by the pointer 22 when it was engaged by the step table 23. The adjustment of the neutral step of the table into the position previously occupied by the pointer, as just described, requires not only that the different operative table steps should be each of a horizontal length about equal to the thickness of the pointer, but also requires a suitable corresponding adjustment of the parts including the adjustable pins 81 and 88 determining the period of engagement of each of the different contacts 82 with the corresponding contact 86. When any of the table steps 24 is horizontally elongated as are all three steps shown in Fig. 6, the engagement of such a step with the pointer can produce no adjustment of the table which is selectively dependent upon the point along the length of the step actually engaged by the pointer. With three horizontally elongated steps as shown in Fig. 6, the table will be adjusted in one direction or the other for definite distances accordingly as the pointer is engaged by the high or low contact. In such case, the actual neutral condition of the instrument permits a range of movement of the pointer along the length of the horizontally elongated central step 24.

The shaft 104 carries at its left extremity (Fig. 4), a spur gear 112 which meshes with and drives spur gear 113 journalled on stud 114 secured to a side plate 27 of the instrument. The stud shaft 114 carries a disc 115 rotatable thereon, a collar being provided on the outer extremity of the stud shaft 114 to support the disc 115. A triangularly shaped spring 116 fits about the shaft 114 and thrusts against the faces of the spur gear 113 and disc 115. The spring 116 acts to drive the disc 115 from the spur gear 113. The disc 115 has clips 117 secured thereto by screws 118, the clips being adjustable about the screws 118 and securable in adjusted position by the screw and slot 119, the screw being threaded into disc 115. The clips 117 support mercury switches 120 and 121. Rotation of the shaft 104 causes tilting of the mercury switches 120 and 121. Stops 122 are secured to the disc 115 by screws or otherwise and cooperate with finger 123 suitably secured to the frame plate 27. The finger 123 serves to cooperate with stop 122 to limit the rotation of disc 115 and also serves as an indicator in cooperation with a mark on the disc 115 to show that position in which the mercury switches are both out of contact or in neutral position. In the neutral positions the mercury switches 120 and 121 may both be out of contact making position, or may both be in contact making position; however, when the disc 115 is rotated to an off normal position, one only of the switches 120 and 121 makes contact. Suitable electrical leads 124 extend from the mercury switches.

Since rotation of the spirally grooved shaft 104 causes corresponding tilting of mercury switches 120 and 121, the neutral position of the switches 120 and 121 corresponds to a definite angular position of the shaft 104 and therefore corresponds to a certain definite lateral position of the step table 23. Thus the neutral for the instrument is determined. In order to adapt the instrument to a particular installation, adjustment of the neutral for the instrument is desirable. Such adjustment may be effected by manipulation of thumb screw 125 pivoted upon a stud fixed in the side plate 27. Thumb screw 125 carries spur gear 126 which meshes with spur gear 112. Rotation of the spur gear 126 effects rotation of the spiral shaft 104 and thereby positions the step table 23 laterally. By holding the disc 125 against rotation while manipulating the thumb screw 125, the spring drive between the spur gear 113 and the disc 115 allowing for slippage, the position which the step table 23 occupies when the instrument is in neutral, may be adjusted.

Thus the operation of the step table 23 gauging the position of the pointer 22 and consequently the operation of the motor 111, causes tilting of the mercury switches 120 and 121 so as to make a contact through one or the other of the mercury switches which corresponds to departure up scale and down scale of the table 23 from its neutral position. Thus a control action is provided which persists so long as the table 23 is off neutral, and the table 23 remains off neutral so long as the pointer 22 continues to occupy an off normal position corresponding to a deviation of the measured condition from schedule.

The sequence of operation of the instrument illustrated in Figures 4 to 9, is as follows:

Beginning with the position of the parts shown in Figures 6, 7, 8, and 9, where cam follower 43 has just passed from a high point to a low point of cam 43 thereby causing lowering of depressor bar 33 to clamp to pointer 22, and where the cam follower 58 rides upon a high point of cam 59 just prior to movement to the low point of the cam, thereby holding the step table 23 in lowermost position, and where cam follower 79 rides upon a high point of the cam 59 just prior to falling to a low point of that cam and acts through crank 78 to hold selector levers 67, 68, and 69 out of engagement with finger 66 and to leave the rock lever 89 free to rotate against its stop 93, the contacts 82 and 86 being out of engagement, the reversible motor 111 being stationary, and the mercury switches 120 and 121 being in slightly tilted position making circuit in switch 120.

Motor 51, which operates continuously, causes rotation of cams 44 and 59. A slight rotation of the cam 59 is sufficient to allow the cam follower 58 to drop from a high point to a low point of that cam, the follower 79 remaining on a high point of the cam 59. The movement of the cam follower 58 results in lifting the step table 23 into contact with pointer 22 and the consequent setting of selector finger 66 into a position which corresponds to the elevation of the step table 23. The depressor bar 33 remains in depressed position clamping the pointer while the step table engages it. Further rotation of the cam 59 allows the cam follower 79 to drop from a high point to a low point of the cam thus permitting crank 78 to swing and release selector levers 67, 68, and 69 so that they may engage selector finger 66. The movement of the crank 78 latches the hook 96 on tongue 94. The pointer remains clamped and the step table remains in engagement with the pointer during the operations consequent upon the drop on the cam follower 78 from a high point to a low point of the cam 59. Further operation of the motor 51 and consequent rotation of cams 44 and 59, causes, by action of cam follower 58 and cam 59, the step table 23 to be lowered and by action of the cam follower 43 and cam 44, and the depressor bar 33 to be raised, thereby freeing the pointer so that its measuring action may continue. Due to the lost motion connection between the arm 60 and the selector levers 61, the arm 60 rotates upwardly from the screw 63 when the step table 23 is lowered. The cam follower 78 riding upon the cam 59, slowly moves the crank 78 and draws by means of hook 96, the rock lever 89 to the left, as shown in Fig. 7. As the rock lever 89 is moved to the left, the pins 88 urge contacts 86 into engagement with the selected one of the contacts 82, the point in the travel of the contact 86 at which it engages with the contact 82 being determined by the distance to which the selector lever in question has been moved inwardly, which in turn is determined by the extent of deflection of the pointer 22 relative to the neutral of step table 23. The movement of the hook 96 to the left causes through the action of cam 98 and pin 99, an unlatching action so as to free the rock arm 89 at a predetermined point in the movement of the crank 78. Therefore the contacts 86 are always moved for a predetermined length of time in each cycle and make contact with one of the contacts 82 for a length of time which is determined by the extent of movement of the selector lever in question, which in turn corresponds to and may be in precise accordance with the deflection of the pointer 22 relative to the table 23. The contact between contact members 82 and contact 86 may be utilized to effect any suitable control action and acts through auxiliary circuits to set the reversible motor 111 in operation to adjust the step table so that its neutral position will correspond to the last gauged position or range of position of the pointer, and at the same time the mercury switches 120 and 121 will be rotated into or out of contact making position. The contacts made by the mercury switches may be utilized to effect suitable control action. The continued rotation of the cams by motor 51, rotates the crank 78 to draw the selector levers 67, 68, and 69 out of engagement with the selector finger 66, which, when freed, is urged by the spring 64 into a position limited by stop 65. The cam follower 43 then passes over the high point of the cam 44 and the depressor bar is lowered to clamp the pointer again and the cycle of operations is repeated starting with the step table at a new datum position.

Thus a controller is provided which in response to variations in the measured condition, may act to effect a control action which is in precise accordance with the rate of change of the measured condition and with the direction of change of the measured condition, and also acts to effect a control action so long as a measured condition remains off schedule, the direction of the last mentioned control action being in accordance with the direction of deviation of the measured condition from schedule.

The particular mechanism described for effecting the above outlined control actions is of the general type shown in different forms in the prior patents of Bean No. 1,825,932, granted October 6, 1931, and Brown No. 1,826,896, granted October 13, 1931. It may be varied in many of its details and may be essentially different in its mode of operation. The control instrument described is of the millivoltmeter type, that is, an instrument in which the deflection of a pointer is in accordance with the variations of a measured condition. Instruments of the potentiometer type which operate upon the principle of balancing a system of forces so as to obtain a null point, may also be employed for effecting such control actions as obtained by the control instrument herein above described. Other forms of instruments which act to measure a quantity and variations of the quantity, and which effect control actions in accordance with the rate of change of the measured quantity, the direction of change of the measured quantity, which act to provide a compensating control so long as the measured quantity remains off schedule and in a correct direction, are well known in the art and may be employed for the purposes of this invention. The invention is not limited to a particular type of control instrument employed.

The liquid level gauge for measuring the level of liquid in the dephlegmator tower or in the reflux leg of the dephlegmator tower is illustrated in Fig. 10. The differential head of pressure is conducted through conduits 127 and 128 through a condenser 129 and through surge prevention chambers 130 of conventional construction, and through conduits 131 and 132 to the high and low pressure sides of a manometer 133. The manometer is provided with a low pressure leg 134 formed in the base of the manometer and a high pressure leg 135 in the form of a pipe fitting threaded into a passage in the base of the manometer, the low and high pressure legs being connected by passage 136. The manometer chambers contain mercury and the liquid transmitting the pressure to the manometer is in direct contact with the mercury. Changes in liquid level within the dephlegmator tower result in changes in level of the mercury within the manometer and float 137 riding upon the surface of the mercury moves with the mercury. Float 137 carries armature 138 moving in tube 139 surrounded by inductance bridge coils 140 which are electrically connected by leads 141 with a receiving inductance bridge coil 142 and with a source of alternating current by power lines 143. Movements of the armature within the inductance bridge coils 140 cause movements of a similar armature 144 within the receiving inductance bridge coils 142. The armature 144 is connected by link 145 through lever 146 pivoted at 147 and having an extension 148 which contacts with arm 149 fixed to shaft 150 pivoted in the frame of the instrument. A spring urges arm 149 against extension 148. The shaft 150 has a pointer 151 secured thereto which co-operates with the step table 152 and with the record receiving chart 153 in the same manner that the pointer 22 cooperates with the table 23 and chart in the above described pyrometer. The control mechanism for the liquid level gauge is like the control mechanism of the instrument of Figures 4 to 9 in all respects, except as to the means by which movements are given to the pointers 151 and 22. Fluctuations in liquid level within the dephlegmator tower act through the manometer and transmitting system to operate the control mechanism in a manner analogous in every respect to that described in the instrument of Figures 4 to 9.

In order to actuate the control valves for regulating the supply of fuel to the furnace and for regulating the supply of steam to the hot oil pump, a suitable motor driven valve mechanism such as is shown in Fig. 11 may be employed. The motor driven valve mechanism in Fig. 11 has motor 154 mounted in the base 155 and operating through shaft 156, drive worm 157, worm wheel 158, pinion 159, gear 160, pinion 161, and gear 162, fixed to shaft 163 which carries eccentric pin 164. Rotation of the motor 154 effects through the reduction gearing, the rotation of eccentric pin 164. Link 165 is connected to eccentric pin 164 and at its other end is connected to link 167 and lever 168 by pin 169. Lever 168 is pivoted on pin 170 and joined by pin 171 to links 172 and 173. Links 172 and 173 are respectively joined to cranks 174 and 175 by pins 176 so that motion of the lever 168 moves the cranks 174 and 175, and valves 177 and 178 respectively, to adjust the valve openings. The cranks 174 and 175 may be joined to the valve proper through a screw 179 by which the relation between the cranks 174 and their respective valve members may be adjusted. Link 167 is pinned to lever 180 mounted for rotation at 181 upon the limit switch box 182. The extremity 183 of lever 180 operates one or the other limit switch 184 or 185 when the valves 177 and 178 have been moved to the limit of adjustment desired in either direction. Suitable set screws 186 are provided for adjusting the throw of the limit switches. The motor control valve mechanism shown in Fig. 11 with its two conduits and control valves 17 and 18 is of known type and form and may be used without change in proportionally controlling the supply fuel to two burner inlets for the furnace 1, if the latter has two such inlets, or can be used in proportionally controlling the supply of oil and atomizing steam to a single burner inlet for the furnace, or can be used to proportionally control the supply of fuel and combustion air to the heater, and in any such use the motor 154 of Fig. 11 will correspond to and serve as the motor 210 of Figs. 1 and 2. The mechanism of Fig. 11 modified by the omission of one of the valves 177 and 178, for example the valve 178, and by the omission of the corresponding parts 173, 175 and 179, may be used to control the steam supply to the pump 10 of Fig. 1, and in such case the motor 154 of Fig. 11 will correspond to and serve as the motor 272 of Figs. 1 and 2.

The measuring instruments together with the regulators, as shown in Fig. 1 of the drawings, may be combined in different combinations in order to effect the desired control actions. Fig. 2 shows a suitable circuit diagram by which one particular combination of control actions, which takes in consideration the interrelation between the variable conditions, may be effected. As has already been indicated the meter instrument of pyrometer 18 may be identical with the meter illustrated in Figs. 4–9. The meter of pyrometer 19 differs from that of pyrometer 18 merely in the omission of the low value mercury switch 120 of Fig. 8. The meter of the liquid level controller 20 may be identical with the meter shown in Figs. 4–9 except in respect to the previously described means by which the pointer 151' of controller 20 is given its movement. For convenience in differentiating between similar parts of the three meters diagrammatically shown in Fig. 2, separate reference symbols are given in Fig. 2 to the different meter contacts, motors and mercury switches corresponding respectively to the contacts 82 and 86, motors 51 and 111, and mercury switches 120 and 121 of the meter shown in Figs. 4–9.

In advance of a more detailed description of the control system shown in Fig. 2 it may be advantageous to note that the motor 210 employed to regulate feed of oil from the dephlegmator 9 to the tubes 2 of the oil heater is controlled exclusively by the oil level controller 20, which exerts two control actions on that motor, one of said actions being a stabilizing action responsive to trend or change in oil level in the dephlegmator and tending to prevent such a change, while the second action is a compensating action responsive to oil level status and tending to maintain the oil level in the dephlegmator at a predetermined normal. The operation of the motor 210 of Fig. 2 which regulates the supply of fuel to the heater 1, and hence the heating effect of the latter is subject to control by each of the three controllers 18, 19 and 20. The furnace pyrometer controller 19 normally exercises a sort of supervisory control over the fuel feed and tends to prevent departure in the rate of fuel feed from a standard rate which may be sometimes constant and sometimes variable, and which is determined by the actions of the oil level and transfer temperature controllers 20 and 18. The furnace temperature controller 19 regulates the fuel feed in response to the furnace temperature status only when the furnace temperature becomes excessive whereupon the controller 18 acts through its one mercury switch 293 to diminish the fuel supply to the furnace, regardless of other controls.

The control actions on the fuel feed motor 272 of the transfer line temperature controller 18 and the oil level controller 20 are combined under some conditions, and are exerted individually and alone under other conditions, and include actions or control effects separately responsive to trend and status. The dominant control of the fuel supply to the furnace is effected by the transfer line temperature controller. The control actions regulating the oil feed to the still and the fuel feed to the furnace, not only stop the motors 210 and 272, and start them into operation in one direction or the other under certain conditions, but also cause each motor to operate at different speeds under certain different conditions. The speed variations of the motors are effected by means of resistors 247 and 357, which are associated with the energizing circuits of motors 210 and 272, respectively in different ways under different conditions making motor operations at different speeds desirable.

In Fig. 2 the symbols F, S and R adjacent certain contacts and relays indicate falling, stationary or stopped, and rising trends. The reference symbols H and L adjacent certain switches and relays indicate that such switches are closed and relays are energized in accordance with high and low status. The reference symbols D and I indicate that the oil and the fuel feeds are decreased and increased, respectively, on the energization of the motor field windings alongside which the said symbols D and I are energized. The motor 51 of each of the three meters shown in Fig. 2 is designated by the reference letter M as well as by an individual reference symbol. The features of the control system of Fig. 2 generally referred to in this and the immediately preceding paragraphs, along with other arrangement and operation features of the control system shown in Fig. 2, will now be described in detail.

In Fig. 2, the inductance bridge, transmitter 140, and receiver 142 are shown diagrammatically as operating the pointer 151 in accordance with the level of oil in the bottom of the dephlegmator tower. Contacts 187 correspond to contacts 86 of the controller instrument hereinbefore described, while the contacts 188, 189, and 190 correspond with the contacts 82 of the control instrument. Contact 188 corresponds to the down-scale step or steps of a control table such as table 23. Contact 189 corresponds to the neutral of the step table and contact 190 corresponds to the upscale step or steps of the control table. 191 and 192 represent field coils of a reversible motor such as shown at 111 in Fig. 4 of the drawings. The reversible motor 191—192 is arranged to drive control mechanism as herein before described. 193 and 194 represent mercury switches such as shown at 120 and 121 in Fig. 8 of the drawings and which are also tilted by operation of the motor 191—192 as described herein before. 195 represents a motor for operating control mechanism such as motor 51, as shown in Fig. 4 of the drawings.

The deflection of pointer 151 effects engagement of one of the contacts 188, 189, or 190 with a contact 187, according to the position of the step table relative to the pointer at that time. Movement of the step table by operation of the reversible motor 191—192, causes the step table to follow the pointer, therefore the control action which is effected through contacts 188, 189, and 190 in cooperation with contacts 187, is in accordance with the rate of change of the measured condition, namely, oil level. The control action effected through those contacts is in a direction and to an extent which is inversely in accordance with the rate of change of oil level. Accordingly, the control action is a stabilizing one tending always to prevent changes in oil level.

One of the mercury switches 193—194, remains in contact making position so long as the liquid level remains off normal and accordingly provides a control action which continues so long as the liquid level remains off normal, which control action tends to restore the oil level to normal. Accordingly, the mercury switches 193 and 194 provide a compensating control action.

Relays 196, 197, and 198 are provided for actuation by contacts 188, 189, and 190 respectively when engaged with one of the contacts 187. Engagement of contact 188 with the contact 187 closes the circuit from the main line through conductor 199, contacts 187 and 188, conductor 200, coil 201 of relay 196, and conductor 202, to the opposite side of the main line. Engagement of contacts 187 and 189 close a circuit from the main line through conductor 199, contacts 187 and 189, conductor 203, coil 204 of relay 197, conductors 205 and 206, back to the opposite side of the main line. Engagement of contacts 187 and 190 close a circuit from the main line through conductor 199, contacts 187 and 190, conductor 207, coil of relay 198, conductor 209, to the opposite side of the main line. Relays 196, 197, and 198 remain closed only so long as energized through contacts 188, 189, and 190. The contacts 188, 189, and 190 operate through relays 196, 197, and 198 to drive a reversible motor 210 corresponding to motor 154 of Fig. 11 and provided with field coils 211 and 212 and limit switches 213.

When relay 196 is closed by engagement of contacts 187 and 188, a motor operating circuit is completed as follows. From the main line through conductor 214, through switch blade 215 of the relay 196 which is in engagement with front contact 216 since relay 196 is closed, from contact 216 through conductor 217, one of the limit switches 213, through field 211 of motor 210, through the armature 218 of motor 210, conductor 219, adjustable resistor 220, conductor 221, to the opposite side of the main line. Contacts 187 and 188 correspond to the down-scale step of the step table when engaged with the pointer and accordingly the operation of said contacts represents a falling oil level, and the field 211, which they energize, operates the motor 210 in a direction such as to decrease the valve opening in the steam line through the hot oil pump and thereby decrease the rate of oil feed from the dephlegmator through the cracking still. The rate of operation of motor 210 may be set as desired by adjustment of resistor 220.

Engagement of the contacts 188 and 187 also operates the motor 191—192 through a circuit as follows. From the main line through conductor 199, contacts 187—188, conductor 200, field 191 of reversible motor 191—192, conductor 222, conductor 223, back contact 224 of relay 197, through switch blade 225, conductor 226, conductor 206, to the opposite side of the main line. Energization of field 191 operates the reversible motor to tilt mercury switches 193—194 in a down-scale direction, that is, in a direction tending to make contact in the low switch 193 and to break contact in the high switch 194. Whether or not contact in the switches 193 and 194 is then made either of the switches 193 and 194 is then made or broken, depends upon the previous positions of the switches and corresponding control table (23).

In a similar manner, when the oil level is rising, the up-scale step of the step table engages the pointer and contacts 187 and 190 are made with the consequent energization of the relay 198. Energization of relay 198 closes a motor operating circuit as follows. From the main line through conductor 214, through switch blade 227 of relay 198, front contact 228 with which switch blade 227 is in engagement, through conductor 229, one of limit switches 213, field 212 of motor 210, armature 218, conductor 219, resistor 220, conductor 221, to the opposite side of the main line. Energization of the field 212 of motor 210 drives the motor 210 in a direction to increase the rate of oil feed through the cracking still.

Engagement of contacts 187 and 190 also operates reversible motor 191—192 through a circuit from the main line, through conductor 199, contacts 187 and 190, conductor 207, field 192, conductor 222, conductor 223, back contact 224 conductor 222, conductor 223, back contact 224 of relay 197, switch blade 225, conductor 226 and conductor 206, to the opposite side of the main line. Actuation of motor 191—192 operates to tilt switch 193—194 in an up-scale direction, that is, in a direction tending to make contact in high switch 194 and to break contact in low switch 193.

The described operation of motor 210 through relays 196 and 198 so regulates the oil feed through the cracking still as to increase the rate of oil feed when the oil level is rising, and to decrease the rate of oil feed when the oil level in the dephlegmator tower is falling, the extent of the regulation being in accordance with the rate of change of the oil level, thereby a stabilizing control tending to prevent changes when the level of oil in the dephlegmator is provided, the strength of the control being regulatable through adjustment of the resistor 220.

While oil level in the dephlegmator tower may vary within moderately wide limits without detrimentally affecting the operating efficiency of the tower, yet it is desirable to provide a midway point or normal level of oil which the system tends to maintain. Such control is effected through mercury switches 193 and 194, one or the other of which is in contact making position so long as the level of oil is off normal.

Mercury switch 193 operates to close a circuit from the main line, through conductor 230, switch 193, conductor 231, coil 232 of relay 233, conductor 234, and conductor 235, to the opposite side of the main line. So long as the oil level is below normal, the mercury switch 193 makes contact and energizes relay 233, the relay 233 remaining closed so long as the oil level in the dephlegmator tower is low.

Likewise mercury switch 194 controls a circuit from the main line through conductor 230, switch 194, conductor 235A, coil 236 of relay 237, conductor 238, conductor 235, to the opposite side of the main line. So long as the level of oil in the dephlegmator tower remains high or above normal, mercury switch 194 remains closed and relay 237 remains energized. Relays 233 and 237 control circuits for energizing motor 210 to regulate the rate of oil feed through the cracking still in such manner as to tend to bring the oil level within the dephlegmator tower back to normal.

Relay 233 energizes motor 210 through a circuit from the main line, through conductor 214, switch blade 239 of relay 197, front contact 240 (when relay 197 is closed), conductor 241, conductor 242, switch blade 243 of relay 233, front contact 244, conductor 245, limit switch 213, field 211 of motor 210, armature 218, conductor 219, resistor 220, conductor 221, to the opposite side of the main line. Relay 237 energizes motor 210 through a circuit from the main line through conductor 214 from one side of the main line, switch blade 239 and front contact 240 of relay 197 (when latter is closed), conductor 241, conductor 240A, blade 243A and front contact 244A of relay 237, conductor 245A, limit switch 213, field 210 and armature 218 of motor 219, conductor 219, resistor 220, and conductor 221 to the opposite side of the main line.

It is to be noted that relay 197 must be closed in order that relay 233 or relay 237 may drive motor 210. When the relay 197 is closed and the motor 210 is set in operation by relay 233 or relay 237, the motor speed is reduced by virtue of a circuit as follows. From a point between the field coils 211 and 212 and the armature 218, through conductor 246, resistor 247, conductor 248, front contact 249 of relay 197, switch blade 225, conductor 226, conductor 206, to the same side of the main line as that to which conductor 214 leads. Thus resistor 247 is shunted across the armature 218 and resistor 220, thereby reducing the current flow through the armature 218 and reducing the speed of motor 210.

Inasmuch as the level of oil in the bottom of the dephlegmator tower is in a critical condition in the operation of a tube still, because if exhausted, the supply of oil through the cracking still will be greatly reduced or even stopped temporarily with disastrous results. On the other hand, if the level of oil within the dephlegmator rises too high, the dephlegmator will fail to operate in the manner intended, therefore a strong stabilizing control is provided that tends to prevent rapid changes in the trend of the oil level. On the other hand the particular normal level selected which the control system operates to maintain is not of great importance so long as the oil level remains between the desired limits. Accordingly the compensating control tending to adjust the oil feed through the cracking still so as to bring the oil level back to normal, may operate at a slow rate. It is for this reason that resistor 247 is shunted across the armature of motor 210 when the compensating control acts. The compensating control acts only when relay 197 is energized and that occurs only when the neutral contact 189 is engaged with one of contacts 187 or when the pointer engages the neutral step of the step table. On the other hand the stabilizing control acts only when the contacts 188 or 190 are engaged, that is, when the trend of the oil level in the dephlegmator tower is rising or falling.

A pyrometer controller operating in response to furnace temperature is shown diagrammatically in Fig. 2, 17 designating the thermocouple in the combustion chamber. The pointer 250 of the furnace temperature pyrometer cooperates with the step table to effect actuation of contacts 251 with the contacts 252, 253, and 254, which correspond to contacts 82 of the controller hereinbefore described. The furnace pyrometer controller is provided with a movable step table driven by reversible motor 255, 256, so that the contacts 252, 253, and 254 will engage with the respective contact 251 according as the furnace temperature is falling, steady or rising. The control action afforded by the engagement of contacts 252, 253, and 254, is in accordance with the rate of change or the trend of the furnace temperature and accordingly provides a stabilizing control tending to resist changes in temperature in the furnace.

In view of the direct effect which furnace temperature has upon the exit oil temperature and because of the large heat capacity of the furnace, large or sudden changes in the furnace temperature are to be avoided because of the undesirable effect on transfer line temperature caused thereby. Accordingly, the furnace pyrometer 250 is arranged to provide a stabilizing control action which tends to prevent changes in furnace temperature, which control action is independent of the operation of other parts of the system.

When the furnace temperature is falling, the pointer 250 engages a down-scale step of the step table and contact is made between contacts 251 and 252, thereby completing the circuit from the main line through conductor 257, contacts 251 and 252, conductor 258, coil 259 of relay 260, conductor 261, to the other side of the main line. In a similar manner, when the furnace temperature is rising, an up-scale step of the step table engages the pointer thereby actuating contacts 251 and 254, which completes a circuit from the main line through conductor 257, contacts 251 and 254, conductor 262, coil 263 of relay 264, conductor 265, to the opposite side of the main line. Relays 260 and 264 are energized only so long as contacts 252 and 254 respectively, are made, therefore, relays 260 and 264 are intermittently energized. The energization of either relay 260 or 264 sets motor 272 into operation to respectively increase or reduce the rate of fuel supply. When the fuel increasing relay 260 is energized, it completes a corresponding operating circuit for the motor 272 as follows. From the main line through conductor 266, switch blade 267 of relay 260, front contact 268, conductor 269, limit switch 270, field 271 of motor 272, armature 273, conductor 274, resistor 275, conductor 276, to the opposite side of the main line.

Likewise, when the fuel decreasing relay 264 is energized, a circuit for operating motor 272 is completed as follows. From the main line through conductor 266, switch blade 277 of relay 264, front contact 278, conductor 279, limit switch 280, field 281, armature 273, conductor 274, resistor 275, conductor 276, to the opposite side of the main line.

Energization of relays 260 and 264 operates to the motor 255—256 (corresponding to motor 11 of Fig. 4) to move the step table (23) which engages pointer 250 and which determine the selection of contacts 252, 253, and 254. Circuits for effecting such drive of the step table are completed as follows. When relay 260 is energized from the main line through conductor 266, switch blade 282 of relay 260, front contact 283 when relay 260 is closed, conductor 284, field 255, conductor 285, back contact 286 of relay 287, switch blade 288, conductor 289, to the opposite side of the main line. Likewise when relay 264 is energized, a circuit is completed from the main line through conductor 266, switch blade 290 of relay 264, front contact 291, conductor 292, through mercury switch 293 if closed, conductor 294, field 256 of reversible motor 255—256, conductor 285, back contact 286 of relay 287, switch blade 288, conductor 289, to the opposite side of the main line. Thus the motor 255—256 is operated to adjust the step table of the furnace pyrometer in accordance with the direction of change of furnace temperature so that actuations of contacts 252, 253, and 254 are in accordance with the rate of change and direction or trend of furnace temperature. The motor 255—256 drives the mercury switch 293 so as to tilt the same.

Inasmuch as the temperature within the furnace may be allowed to fall as low as required by the operating necessities of the system under control, no lower limit is placed upon the furnace temperature. However, in order to prevent destruction of the furnace, it is necessary to place an upper limit on the furnace temperature and the mercury switch 293 is provided for that purpose. When the furnace temperature rises to a dangerous point, the mercury switch 293 is opened thereby preventing operation of motor 255—256 with further increase in furnace temperature. The result is that the step table ceases to follow the pointer in an up-scale direction and the pointer engages the up-scale step of the step table repeatedly and operates to energize relay 264 at a maximum rate, thereby energizing field 281 of motor 272 to cut down the supply of fuel at a maximum rate. When the temperature falls from a dangerous level, the operation of the step table to follow the pointer, proceeds as before, the field 255 of motor 255—256 being energized by the falling trend of temperature which operates to move the step table in a down-scale direction and simultaneously to tilt mercury switch 293 so as to render the field 256 operable again for moving the step table in an up-scale direction to follow the pointer 250.

It is to be noted that the reversible motor 255—256 may be energized only so long as neutral relay 287 is open, therefore when relay 287 is energized the motor 255—256 will not be operated even though relays 260 and 264 should then be energized.

The circuits for driving the motor 272 which are completed through the operation of contacts 252 or 254, are independent of other circuits and therefore the speed of motor 272 is entirely dependent upon the adjustment of resistor 275 which may be adjusted to provide any suitable strength of control. Making of contact 252 energizes field 271 to increase the fuel supply, and making of contact 254 energizes field 281 to decrease the fuel supply, thus a control operating in accordance with the direction and rate of change of temperature within the furnace for regulating the fuel supply to oppose such changes, is provided.

The making of contact 253 when the neutral step of the step table engages pointer 250, energizes relay 287 through a circuit as follows. From the main line through a conductor 257, contacts 251 and 253, conductor 295, coil 296 of relay 287, conductor 289, to the opposite side of the main line. The functions of relay 287 will appear later in the description. A motor 297 (corresponding to motor 51 of Fig. 4) drives the control mechanism of the furnace temperature pyrometer.

The transfer line temperature, for most efficient operation of the oil cracking unit, should be held substantially constant, which temperature depends upon the nature of the oil being cracked and upon other operating characteristics of the system and is usually between 850 and 950° F. Transfer line temperature is measured by thermocouple 13, Fig. 1, shown at 13 diagrammatically in Fig. 2, and operates the pointer 298 of the transfer line pyrometer controller. The pointer 298 of the transfer line pyrometer controller co-operates with a step table such as step table 23 of the controller hereinbefore described, to move contacts 299, 300, and 301 into engagement with contacts 302, which contacts correspond to the contacts 82 and 86 of the controller before described. Actuation of contacts 299 and 301 completes circuits from the main line through conductor 303, contacts 302, contacts 299 and 301 respectively, fields 304 and 305 respectively, conductor 306 to the opposite side of the main line. The reversible motor 304—305 for driving the step table in the direction of movement of the pointer 298 corresponds to the motor 111 of the controller hereinbefore described. The reversible motor 304—305, when operating, is connected to tilt the mercury switches 307 and 308, which correspond to switches 120 and 121 of the controller hereinbefore described. The motor 309 (corresponding to motor 51 of Fig. 4) drives the control mechanism of the transfer line pyrometer.

The operation of the reversible motor 304—305 to drive the step table in the direction of movement of the pointer 298 provides a control action through contacts 299, 300, and 301, which is in accordance with the direction and rate of change or trend of transfer line temperature. The tilting of switches 307 and 308 energizes the hereinafter described relays 336 and 340, and when this is effected by energization of contacts 299 and 301 of controller 18 thereby provides a control action which is in accordance with the off-normal condition or status of transfer line temperature and which ultimately sets into operation control actions tending to bring the transfer line temperature back to normal. When transfer line temperature is normal mercury switches 307 and 308 are open. Alternatively, when transfer line temperature is normal both switches 307, 308 may be closed in which case the transfer line temperature hunts normal.

Inasmuch as the regulatable conditions are the rate of oil flow through the cracking still and the rate of feed of fuel to the furnace, the transfer line pyrometer controller must operate to adjust the oil cracking system through those regulators. However, those regulators are proximately related to the oil level and to the furnace temperature respectively, and are controlled by variations in the oil level and furnace temperature as hereinbefore described. Inasmuch as the level of oil in the bottom of the dephlegmator tower is a critical condition, the control of oil feed through the cracking still is regulated primarily by that oil level. On the other hand, the furnace temperature may be at any level so long as it is not high enough to be detrimental to the furnace structure, and accordingly the transfer line pyrometer controller operates primarily to regulate the supply of fuel to the furnace. However, for reasons pointed out above, it is desirable that the furnace temperature be held steady and the furnace pyrometer controller operates to tend to hold the furnace temperature steady, that is, to prevent changes in furnace temperature regardless of the degree of furnace temperature, there being no action by the furnace pyrometer controller tending to maintain the furnace temperature at a predetermined degree other than the operation of the mercury switch 293 which tends to prevent the furnace temperature from being dangerously high. As will appear hereinafter, the furnace pyrometer controller operates in conjunction with the oil level controller and transfer line temperature controller to permit variation of the furnace temperature at certain rates, the furnace pyrometer controller operating to stabilize the rate of change of the furnace temperature so that the furnace temperature is changed only at the desired rate. Accordingly, the furnace pyrometer controller operates when the furnace temperature changes from the steady state or when the furnace temperature deviates from the rate of change of the furnace temperature imposed by the transfer line controller and oil level controller to engage the contacts 252 and 254 so as to provide a stabilizing control. At all other times the neutral step of the step table of the furnace pyrometer controller is engaged by pointer 250 causing actuation of contact 253, at which time the influence of the transfer line controller and the oil level controller come into play.

While the transfer line pyrometer controller operates primarily to regulate the rate of fuel feed to the furnace, yet the trend and the status or off-normal condition of the oil level must be taken into consideration in making such adjustments of the rate of fuel feed inasmuch as the trend and status of the oil level tend to affect the transfer line temperature.

The influence of a falling trend in oil level upon the transfer line temperature is brought into play as follows. When the oil level is falling, contact 188 of the liquid level controller is made thereby energizing relay 196, the contact 188 and the relay 196 being operated intermittently. When relay 196 is energized, a circuit is completed as follows. From the main line through conductor 214, the switch blade 310 of relay 196, front contact 311, conductor 312, coil 313 of relay 314, conductor 315, conductor 316, to the back contact 224 of relay 197, switch blade 225, conductor 226, conductor 206, to the opposite side of the main line, thereby energizing relay 314.

In a similar manner, when the trend of oil level is rising, the effect of that condition upon the transfer line temperature is made effective as follows. The rising oil level causes engagement of contacts 187 and 189 with the consequent energization of relay 198, the contact 190 and relay 198 being operated intermittently. Energization of relay 198 completes a circuit as follows. From the main line through conductor 214, switch blade 317 of relay 198, front contact 318, conductor 319, coil 320 of relay 321, conductor 322, conductor 316, conductor 223, back contact 224 of relay 197, switch blade 225, conductor 226, conductor 206, to the opposite side of the main line.

It may be noted that a parallel circuit from conductor 316 exists through conductor 222, fields 191 and 192, conductors 200 and 207, relay coils 201 and 208 and conductors 202 and 209 respectively, to the same side of the main line to which conductor 206 leads. However, the impedance through the fields 191 and 192, and relay coils 201 and 208, is so great that this parallel circuit has no effect upon the operation of relays 314 and 321.

When relay 314 is closed, the holding circuit for that relay is completed from the main line through conductor 323, conductor 324, back contact 325 of relay 321, switch blade 326, conductor 327, switch blade 328 of relay 314, front contact 329 to the coil 313 of relay 314, conductor 315, conductor 316, conductor 223, back contact 224 of relay 197, switch blade 225, conductor 206, to the opposite side of the main line.

In a similar manner when relay 321 is closed, a holding circuit for that relay is completed as follows. From the main line through conductor 323, conductor 330, back contact 331 of relay 314, switch blade 326, conductor 327, switch blade 328, front contact 332, coil 320 of relay 321, conductor 322, conductor 316, conductor 223, back contact 224 of relay 197, switch blade 225, conductor 226, conductor 206, to the opposite side of the main line.

It will be observed that the holding circuit for relay 314 depends upon relay 321 being open, and that the holding circuit for relay 321 depends upon relay 314 being open, also the holding circuits for both the relays 320 and 321 depend upon the relay 197 being open; therefore, when one or the other of the relays 314 or 321 is closed by virtue of actuation of relays 196 or 198 respectively, the relay 314 or 321 remains energized until either relay 197 is energized or the other of the relays 314 and 321 is energized. That is, relay 314 remains energized so long as oil level is falling, relay 321 remains energized so long as the oil level is rising, both of the relays 314 and 321 are open so long as the oil level trend is steady.

The influence of the status or off-normal condition of the liquid level is made effective through actuation of relays 233 and 237 by mercury switches 193 and 194 respectively in the manner hereinbefore described. Relay 233 remains closed so long as oil level is low. Relay 237 remains closed so long as oil level is high.

Relays 233 and 237 are both open when the oil level is normal.

The status or off-normal condition of the transfer line temperature is made effective in the operation of the motor 272 for regulating the feed fuel to the furnace, relays 336 and 340 as follows. When the transfer line temperature is low, a circuit is closed from the main line through conductor 333, closed switch 308, conductor 334, coil 335 of relay 336, conductor 337, conductor 235, to the opposite side of the main line, thereby energizing relay 336 and holding relay 336 so long as the mercury switch 308 is closed, that is, so long as the transfer line temperature is low. In a similar manner, when the transfer line temperature is high, a circuit is completed from the main line through conductor 333, closed mercury switch 307, conductor 338, relay coil 339 of relay 340, conductor 341, conductor 235, to the opposite side of the main line. So long as the transfer temperature is high, mercury switch 307 remains closed and relay 340 remains closed. When the transfer line temperature is normal, relays 336 and 340 are both open.

In order to maintain the transfer line temperature at the desired point, a trend of the transfer line temperature should be and preferably is anticipated and made effective to regulate the supply of fuel to the furnace in such a manner as to tend to prevent changes in the transfer line temperature. A falling transfer line temperature tends to produce a low transfer line temperature and a rising transfer line temperature tends to produce a high transfer line temperature, therefore the control effect resulting from the trend of transfer line temperature must be combined with the control effect produced by the status, that is, off-normal condition of the transfer line temperature. If the transfer line temperature is high, it is necessary that it be allowed to fall. If it is low, it is necessary that it be allowed to rise. If it is normal and tends to rise, the fuel supply should be regulated to prevent the rising trend. If it is normal and tends to fall, the fuel supply should be regulated to prevent it from falling.

In general such control effects are obtained as a result of the fact that a falling transfer line temperature causes the energization of the contact 299 and field 304 and the rotation of the mercury switches 307 and 308 in a direction such as to tend to make contact in switch 308, and break contact in switch 307, whereas a rising transfer line temperature results in the energization of the contact 301 and field 305 and the rotation of the mercury switches 307 and 308 in such a direction as to make contact in mercury switch 307 and break contact in mercury switch 308. The precise manner in which the transfer line temperature controller 18 thus effects the described control actions may vary with the form and adjustment of the control instrument proper as well as in accordance with the character of its connection into the control system. For example, in one commercial installation of the character illustrated in Fig. 2, the instrument 18 employed was one having three control steps 24 with the central step horizontally elongated, as shown in Fig. 6, permitting of its engagement by the pointer 22 with the latter in any portion of an appreciable range of deflection corresponding to the length of the central step.

In making said installation the instrument was adjusted so that the maximum table movement effected on the engagement of the pointer with either the high or low step 24 would be appreciably greater than the horizontal length of the central or neutral table step 24, and so that the maximum table adjustment produced as hereinafter described when the pointer engages the neutral table step would be appreciably less than said horizontal length, and about 40% of the maximum table adjustment produced by an engagement of the pointer with either the high or low table step.

If in said installation the instrument had no back lash or lost motion, each of the table adjustments resulting from the pointer engagement with either the high or low step 24 would always be of the same length. In said installation, however, the adjustment of the instrument permits of sufficient back lash or lost motion, so that any table adjustment in one direction following an immediately preceding adjustment in the same direction is some 40% greater than when the adjustment in one direction follows an immediately preceding adjustment in the opposite direction. This difference in extent of table adjustments resulting from back lash or lost motion while advantageously utilized in the above mentioned installation is not essential to the general character of the control actions contemplated and obtained in said installation, although when present it must be taken into account.

As a result of the difference between the extent of each table adjustment and the range of deflection of the pointer relative to the table in which the pointer is in position for engagement by the intermediate table step, during a period in which the transfer line temperature is falling, the fraction of the period during which the switch 308 is closed will be greater when the rate of temperature fall is relatively rapid than when the rate is relatively slow. For example, with a sufficiently rapid rate of temperature fall, it is possible for all of the resultant table adjustments to be in the same direction, whereas with a slower rate of temperature fall, some of the table adjustments will be reverse adjustments. The converse condition prevails when the temperature is rising. In the more normal condition of operation in which the transfer line temperature deviates more or less rapidly away from its normal value to a limited extent and then tends to remain stationary until it begins to return definitely toward the predetermined value, the fraction of the period during which the departure from normal continues, in which the corresponding switch 307 or 308 is open, is increased.

It will be observed, therefore, that the falling transfer line temperature adjusts the mercury switches 307 and 308 in a direction tending to anticipate a low transfer line temperature, and vice versa, a rising temperature tilts mercury switches 307 and 308 in a direction tending to anticipate a high transfer line temperature. A suitable control effect in accordance with high or low transfer line temperature is made as will be hereinafter described.

The trend of the oil level tends to effect a transfer line temperature as follows. A falling oil level makes necessary a decrease in the rate of the hot oil feed to the cracking still and therefore tends to increase the transfer line temperature, and a rising oil level in the dephlegmator tower makes necessary an increase in the rate of hot oil feed to the cracking still and therefore tends to reduce the transfer line temperature. The trend of the transfer line temperature is a dominating factor and so long as it is rising or falling it alone adjusts the mercury switches 307 and 308 in anticipation of the effect of the transfer line temperature trend. However, when the transfer line temperature is steady, the effect of the oil level trend upon the transfer line temperature should be anticipated. Such a control action is effected as follows. If the oil level is falling and the transfer line temperature is steady, relay 314 is closed and remains closed, while the oil level is falling and a circuit is completed as follows. From the main line through conductor 303, conductor 342, through switch blade 343 of relay 314, front contact 344, conductor 345, field 305, conductor 306, to the opposite side of the main line. Thus a falling oil level in the dephlegmator tower which tends to cause a high transfer temperature, actuates the reversible motor 304—305, to tilt mercury switches 307 and 308 in a direction tending to close switch 307 and to open switch 308, that is, in anticipation of the high transfer line temperature which the falling trend of the liquid level tends to produce.

In a similar manner, when the oil level is rising, relay 321 is held in closed position and if the transfer line temperature is steady, contact 300 will be intermittently engaged to close the circuit as follows. From the main line through conductor 303, contacts 302 and 300, conductor 342, switch blade 346 of relay 321, front contact 347, conductor 348, field 304, conductor 306, to the other side of the main line, thereby operating the motor 304—305 to tilt mercury switches 307 and 308 in a direction tending to make contact in mercury switch 308 to break contact in mercury switch 307 in anticipation of a low transfer line temperature which the rising oil level tends to produce. When the oil level is steady and the transfer line temperature is steady, no action of motor 304—305 takes place. It should be observed that with the instrument adjusted as above described so that each period of operation of the motor 111 produced by the energization of the contact 300 is shorter than each period of operation produced by the energization of either of contacts 299 and 301, the effect on the positions of the switches 307 and 308 of the oil level trend is less pronounced than the effect of transfer line temperature trend.

When the transfer line temperature is high, it is necessary to reduce the rate of fuel supply in order to bring the transfer line temperature back to normal; however, the trend and the status of the oil level at that time must be taken into consideration in determining the rate at which the fuel supply is reduced in order to anticipate the effect of the oil level trend and status on the transfer line temperature so that overshooting of the transfer line temperature will be prevented.

When the transfer line temperature is high and the oil level is falling, it is desirable to decrease the rate at which fuel is supplied rapidly. Such a control action is effected as follows. Due to the high transfer line temperature, relay 340 is energized. Due to the falling oil level, relay 314 is energized. Either of relays 233 and 237 may be energized or neither may be energized, according to whether the oil level is high, low, or normal. Under such control conditions, circuits are completed as follows. From the main line through conductor 266, switch blade 349 of relay 287, front contact 350, conductor 351, switch blade 352 of relay 340, front contact 353, conductor 354, coil 263 of relay 264, conductor 265, to the opposite side of the main line. This circuit is completed only when relay 287 is energized, which occurs only when the center step of the step table engages pointer 250 of the furnace pyrometer controller. Thus the relay 264 is energized each time the center step of the step table of the furnace temperature pyrometer engages the pointer 250, provided that the control conditions exist as specified above.

When the relay 264 is energized, the field 281 of motor 272 is energized through a circuit before described, and the motor 272 is operated to decrease the fuel supply. The rate of operation of the motor 272 is determined by a circuit as follows. From that side of the main line to which resistor 275 is connected, through conductor 289, switch blade 288 of relay 287, front contact 355 when the relay 287 is closed, conductor 356, resistor 357, conductor 358, conductor 359, switch blade 360 of relay 314, front contact 361, conductor 362, switch blade 363 of relay 233. As before stated, relays 233 and 237 either or neither may be energized. If both relays 233 and 237 be open, circuit continues through the back contact 364, through conductor 365, switch blade 366 of relay 349 (which is closed), front contact 367, conductor 368, to the line side of armature 273 of motor 272. If relay 233 be energized, the circuit proceeds through front contact 369, conductor 370, switch blade 371 of relay 336 (which is open), back contact 372, conductor 373, conductor 368 of the armature 273. If the relay 237 be closed, relay 233 is open and the circuit proceeds as first described. Accordingly, regardless of whether the oil level is high, low, or normal, the resistor 357 is placed in parallel with the resistor 275 so as to increase the current flowing through the motor 272 and thereby increase the speed of operation of the motor so as to decrease the rate of fuel supply rapidly. Thus the conditions of a high transfer temperature and a falling oil level always produce a reduction in the rate of supply of fuel to the furnace at a rapid rate.

When the transfer temperature is high and the oil level trend is steady, another degree of regulation of the fuel supply to the furnace is required. A high transfer temperature calls for a reduction in the rate of supply of fuel to the furnace but the steady liquid level if continued, would produce no change in the transfer temperature and therefore the trend of the oil level should be ignored. Whether or not the oil level is high, low, or normal, is of little consequence in this instance, so that the high transfer temperature is the sole condition operating to control the rate of fuel supply to the furnace. Of course the trend of transfer temperature has its influence insofar as it adjusts the transfer pyrometer control in anticipation of the change at which it will produce in the status of the transfer pyrometer.

Inasmuch as oil level trend has no influence in this instance because it is steady, the rate at which the fuel supply to the furnace should be changed is less than that in the case when the oil level was falling and the transfer temperature was high. The operation of the control mechanism to reduce the fuel supply at a rate which may be called a standard rate, inasmuch as it is determined solely by the status of the transfer temperature, is as follows. The high condition of the transfer temperature operates through mercury switch 307 to maintain relay 340 closed. The relays 314 and 321 are both open because of the steady liquid level. Relays 233 and 237 may either be closed or both open according as the liquid level is high, low, or normal. With the control circuit so adjusted, the following circuits are completed for operating the motor 272. From the main line through conductor 266, switch blade 349 of relay 287, front contact 350 provided the relay 287 is closed which occurs whenever contact 253 of the furnace pyrometer controller is made, through conductor 351, switch blade 352 of relay 340 which is closed, front contact 353, conductor 354, coil 263 of relay 264, conductor 265, to the other side of the main line. Thus relay 264 is energized each time relay 287 is energized, that is, whenever the neutral contact of the furnace pyrometer controller is made.

The circuit containing the resistor 357, which is provided for regulating the rate at which the motor 272 operates, may be traced as follows. From that side of the main line to which the resistor 275 is connected, through conductor 289, switch blade 288 of relay 287, front contact 355, conductor 356, resistor 357, conductor 358, to the switch blades of relays 314 and 321, which, when open, terminates the circuit for resistor 357, therefore resistor 357 is left out of circuit and the motor 272 operates at a standard rate determined by the adjustment of resistor 275, the circuit for the motor 272 being closed by virtue of the closing of relay 264 in a manner before described. Inasmuch as the circuit of resistor 357 terminates with the relays 314 and 321, the positions of relays 283 and 237 are without influence upon the rate of operation of motor 272, therefore so long as the transfer temperature is high and the oil level trend is steady, the motor 272 operates at a standard rate of supply of fuel to the furnace.

When the transfer temperature is high and the oil level is rising, the two conditions tend to some extent to compensate in their effect upon the transfer line temperature, that is, the high transfer line temperature calls for a reduction in the rate of fuel supply in order to bring the transfer line temperature back to normal. On the other hand, the rising trend of the oil level makes necessary and does operate the oil level controller in a manner such as to increase the rate of oil feed through the cracking still, which in turn tends to reduce the transfer line temperature. Inasmuch as the rising oil level trend tends to reduce the transfer line temperature, the rate at which the fuel supply to the furnace is reduced in response to the high transfer line temperature, should be less than is the case where the oil level trend is steady. The operation of the control system for decreasing the rate of fuel supply at any rate less than the standard rate, is as follows. As described before, the high transfer line temperature operates the mercury switch 307 to maintain the relay 340 closed, which in turn causes the relay 264 to close whenever neutral contact of the furnace temperature pyrometer is made.

The closing operation of the relay 264 energizes the circuit through field 281 of the motor 272 for decreasing the fuel supply as before described. The rate of operation of the motor 272 is affected by the manner in which resistor 357 is placed in the motor circuit. When the oil level trend is rising, relay 321 is closed as before described, and held in closed position continuously. Under such conditions the circuit for the resistor 357 is as follows. From that side of the main line to which resistor 275 is connected through conductor 289, switch blade 288 of relay 287, through front contact 355, when the relay 287 is energized, through conductor 356, resistor 357, conductor 358, conductor 374, switch blade 375 of relay 321, front contact 376, conductor 377, switch blade 378 of relay 237. The relays 233 and 237 may either or neither be energized, according to the status of the oil level. When the oil level is normal, both relays 233 and 237 are open and the circuit for resistor 357 proceeds as follows. From the switch blade 378, through back contact 379, conductor 380, switch blade 381 of relay 336 which is open, back contact 382, conductor 383, conductor 384, conductor 385, to a point in the circuit for the motor 272 between the field and armature. If the liquid level is high, relay 237 is held closed and the circuit proceeds from switch blade 378, front contact 386, conductor 387, switch blade 388 which is closed, front contact 389, conductor 390, conductor 385 to the same point in the motor circuit. If the liquid level be low, relay 233 will be closed, relay 237 will be open, and the circuit will proceed in the same manner as when both relays 233 and 237 were open. Thus with the transfer line temperature high and the oil level trend rising, the resistor 357 is shunted across the armature 273 and resistor 275 so as to reduce the current flowing through the armature 273 and thereby to cause the motor 272 to operate at a reduced rate so that the rate at which the fuel supply is reduced is slow.

When the transfer line temperature is normal, three sets of possible conditions may arise according as the oil level is falling steady or rising. In addition, the status of the oil level comes into play in this combination. When the transfer line temperature is high, as above described, it controls the direction of operation of the motor 272 for regulating the fuel supply to the furnace; however, when the transfer line temperature is normal, it is without effect upon the direction of operation of motor 272. Accordingly, the motor 272 is operated in a direction and at a rate such as to anticipate the effect of the oil level trend upon transfer line temperature.

A falling oil level trend operates the oil level controller to decrease the rate of supply of oil through the cracking still which tends to increase the transfer line temperature, therefore the supply of fuel to the furnace should be reduced in anticipation of the falling transfer line temperature, and inasmuch as the transfer line temperature is normal the rate at which the fuel supply is reduced should be slow. Such operation of the motor 272 is effected as follows. With a normal transfer line temperature, relays 336 and 340 are both open. With a falling oil level trend, relay 314 is maintained closed. The closed condition of relay 314 completes a circuit as follows. From the main line to conductor 266, switch blade 349 of relay 287, front contact 350 when the relay 287 is closed, conductor 351, through switch blade 391 of relay 336 which is open, back contact 392, conductor 393, back contact 394 of relay 340 which is open, switch blade 395, conductor 396, switch blade 397 of relay 314 which is closed, front contact 398, conductor 399, conductor 354, coil 263 of relay 264, conductor 265, to the opposite side of the main line. Thus relay 264 is energized each time the neutral contact of the furnace pyrometer controller is made to operate motor 272 in a direction to decrease the rate of fuel supply to the furnace.

It will be observed that the direction of rotation of motor 272 is determined by the trend of oil level through relays 314 and 321 when the transfer line temperature is steady. The rate at which the motor 272 is operated to reduce the rate of fuel supply involves the status of the oil level. If the oil level be low in the condition of falling oil level, the rate at which the oil supply through the cracking still is reduced is a maximum, and the ultimate effect upon the transfer line temperature to increase the same will be a maximum. Under such conditions it is desirable to reduce the rate of fuel supply rapidly in anticipation of a quick rise in transfer line temperature. With the oil level low, relay 233 is energized and the resistor 357 is placed in circuit as follows. From the main line through conductor 289, switch blade 288 of relay 287 when it is closed, front contact 355, conductor 356, resistor 357, conductor 358, conductor 359, switch blade 360, front contact 361, conductor 362, switch blade 363 of the relay 233 which is closed, front contact 369, conductor 370, switch blade 371 of relay 336 which is open, back contact 372, conductor 373, conductor 368, to that side of the armature 273 to which conductor 274 leads. Thus the resistor 357 is placed in parallel with resistor 275 causing an increase in the current flow through motor 272 and the rapid operation of the motor 272 in a direction to decrease the rate of fuel supply to the furnace.

When the oil level is either normal or high, the rate at which the oil feed through the cracking still is reduced is regulated solely by the falling trend of oil level and the anticipated effect upon the transfer line temperature is not so great, therefore it is desirable under such conditions to operate the motor 272 at a slow rate to decrease the fuel supply to the furnace. When the liquid level is normal, both relays 233 and 237 are open, and when it is high, relay 237 alone is closed. Under such conditions resistor 357 is placed in circuit as follows. From the resistor 357 which is connected to the main line, through conductor 358, conductor 359, switch blade 360 of relay 314, front contact 361, conductor 362, switch blade 363 of relay 233 which is open, back contact 364, conductor 365, switch blade 366 of relay 340 which is open, back contact 400, conductor 401, conductor 385, to a point in the motor circuit intermediate the field and armature. It will be observed that this circuit proceeds as described regardless of whether relay 237 is open or closed, and therefore whether the liquid level be normal or high. The circuit last described places the resistor 357 in shunt across the armature 273 and resistor 275 so as to reduce the current flow through the armature and therefore reduce the speed of operation of motor 272 so that the motor 272 operates to reduce the rate of fuel supply to the furnace slowly.

When the transfer line temperature is normal and the oil level trend is steady, no immediate action upon the rate of fuel supply is necessary. The oil level may be high, low, or normal under such conditions, but the change in rate of oil supply through the cracking still in consequence of a high or low oil level is a slow one and of minor effect upon the transfer line temperature. The trend of the transfer line temperature affects, as before described, the mercury switches 307 and 308 to adjust them in the direction of the anticipated transfer line temperature change due to the trend with a consequent control action. Therefore, under the condition of a normal transfer line temperature and a steady oil level, it is desirable that the motor 272 be non-operative.

Under such circumstances the circuit for energizing the relay 264, when the neutral contact of the furnace pyrometer controller is made, terminates as follows: From the main line through conductor 265, coil 263 of relay 264, conductor 354 to front contact 353, and also through conductor 399, to front contact 398 of relays 340 and 314 respectively. Both of those relays being open, the relay 264 remains unenergized.

In a similar manner the circuit for energizing the relay 260, which is arranged to operate the motor 272 in a direction to increase the fuel supply, remains open because of the open condition of relays 336 and 321, therefore the motor 272 remains stationary except for operation by a furnace temperature trend hereinabove described which causes the falling or rising temperature contacts 252 and 254 of the furnace pyrometer to be actuated.

When the transfer line temperature is normal and the oil level is rising, the effect of the oil level trend upon transfer line temperature should be anticipated. A rising oil level trend operates the liquid level controller to increase the rate of hot oil feed through the cracking still which tends to cut down the transfer line temperature, therefore it is desirable to increase the rate of fuel supply in anticipation of the falling transfer line temperature. A circuit for then energizing relay 260 and thereby operating the motor 272 in a direction to increase the fuel supply is completed as follows: From the main line through conductor 266, switch blade 349 of relay 287, front contact 350 when the relay 287 is closed by virtue of engagement of the neutral contact 253 of the furnace pyrometer controller, through conductor 351, switch blade 391 of relay 336 which is open, back contact 392, conductor 393, back contact 394, switch blade 395 of relay 340 which is open, conductor 396, conductor 402, switch blade 403 of relay 321 which is closed, front contact 404, conductor 405, conductor 406, coil 259 of relay 260, conductor 261, to the other side of the main line. Thus so long as the transfer line temperature is normal, the oil level trend is rising and the neutral contact of the furnace pyrometer controller is engaged, the relay 260 will be energized to close the circuit for operating the motor 272 through field coil 271 as before described, to increase the rate of supply of fuel to the furnace. If the oil level be normal or low, the operation of motor 272 to increase the fuel supply, should be at a slow rate. In order to so operate motor 272, resistor 357 is placed in circuit as follows. From resistor 357 which is connected to the main line, through conductor 358, conductor 374, switch blade 375 of relay 321 which is closed, front contact 376, conductor 377, switch blade 378 of relay 237 which is open when the oil level is low or normal, back contact 379, conductor 380, switch blade 381 of relay 336, back contact 382, conductor 383, conductor 384, conductor 385, to a point in the motor circuit intermediate the field and armature. Thus the resistor 357 is shunted across the armature 273 and resistor 275 of the motor circuit so as to reduce the current through the armature and cause the motor 272 to operate at a slow rate. Accordingly, with a normal transfer line temperature, a rising oil level trend, a low or normal oil level, the rate of fuel supply is increased slowly in anticipation of a falling transfer line temperature.

If the oil level should be high when it is rising, the oil level controller operates to increase the rate of hot oil through the cracking still at a maximum rate, and if the transfer line temperature be normal at such time, it is desirable to increase the rate of fuel supply rapidly in anticipation of a sudden decrease in transfer line temperature. As before described, the rising oil level trend operates the relay 321 to close circuits for energizing field 271 of motor 272, thus operating the motor 272 in a direction to increase the fuel supply. The combination of high oil level with rising oil level trend, places the resistor 357 in circuit as follows. From the resistor 357 which is connected to the main line when relay 287 is closed, through conductor 358, conductor 374, armature 375 of relay 321, front contact 376, conductor 377, armature 378 of relay 237 which is closed when the oil level is high, front contact 386, conductor 387, switch blade 388 of relay 340 which is open, back contact 407, conductor 408, conductor 368, to that side of the armature 273 to which conductor 274 is connected. Thus the resistor 357 is placed in parallel with resistor 275 to increase the current flow through armature 273 to operate motor 272 at a rapid rate to increase the fuel supply.

It will be observed from the immediately preceding description that with the normal transfer line temperature, the oil level trend determined the direction of operation of the motor 272 to regulate the rate of fuel supply to the furnace, and that the oil level trend together with the status of the oil level operates to adjust the rate of operation of motor 272 to determine the rate at which the fuel supply to the furnace is adjusted.

When the transfer line temperature is low, the control system operates to run the motor 272 in a direction to increase the fuel supply to the furnace. The circuit by which the direction of rotation of the motor 272 is effected by virtue of the low transfer line temperature, is as follows. The low transfer temperature causes mercury switch 308 to be closed which energizes relay 336 as before described. The closed condition of relay 336 operates relay 260 through a circuit as follows. From the main line through conductor 266, armature 349 of relay 287, through front contact 350 when the relay 287 is closed by virtue of the engagement of the neutral contact of the furnace pyrometer controller, through conductor 351, switch blade 407' of relay 336, front contact 408', conductor 406, coil 259 of relay 260, conductor 261, to the other side of the main line. Thus so long as the transfer line temperature remains low, relay 260 will be energized whenever the neutral contact of the furnace pyrometer controller is actuated. When the relay 260 is closed, a circuit through field 271 for operating motor 272 is completed as hereinbefore described. Energization of motor 272 through field coil 271 operates the same to increase the rate of fuel supply to the furnace. The rate at which motor 272 is operated, is determined by the anticipated effect of the oil level trend upon the transfer line temperature, thus if the oil level is falling the oil level controller operates to decrease the rate of feed of hot oil through the cracking still which tends to increase the transfer line temperature so that the falling oil level trend results in an adjustment tending to correct for the low transfer line temperature, therefore the fuel supply should be increased slowly. When the oil level trend is steady, the operation of the oil level controller in adjusting the rate of hot oil feed through the cracking still is without substantial effect upon the transfer line temperature, and accordingly the motor 272 should be operated at a rate to increase the rate of supply of fuel to the furnace as necessary to compensate for the low condition of transfer line temperature. Furthermore, when the oil level has a rising trend, the oil level controller operates to increase the rate of feed of hot oil through the cracking still which tends to reduce the transfer line temperature thereby further aggravating the low transfer line temperature which makes necessary the operation of motor 272 at a rapid rate in order to compensate not only for the low transfer line temperature but for the tendency of the oil level controller to further reduce the transfer line temperature.

The control system operates to effect the above described operation of motor 272 at various rates according to liquid level trend, as follows. When the oil level is falling, relay 314 is closed and the resistor 357 which is connected to the main line whenever relay 387 closes, is placed in a circuit as follows. From resistor 357, through conductor 358, switch blade 360, front contact 361, conductor 362, switch blade 363 of relay 233. If the relay 233 is opened due to a high or normal liquid level, the circuit proceeds through back contact 364, conductor 365, switch blade 366 of relay 340 which is open, back contact 400, conductor 401, conductor 385, to a point in the motor circuit intermediate the field and armature. If the relay 233 is closed due to a low oil level, the circuit proceeds from a front contact 369, conductor 370, switch blade 371 of relay 336 which is closed, front contact 409, conductor 410, conductor 384, conductor 385, to the same point in the motor circuit; therefore, with a falling oil level, regardless of the status of the oil level, the resistor 357 is shunted across the armature 273 and resistor 275 of the motor circuit and causes the motor 272 to operate slowly in a direction determined by the low transfer line temperature, that is, to increase the rate of fuel supply.

If the oil level trend is steady, the resistor 357 is placed in circuit as follows. From the resistor 357 which is connected to the main line whenever relay 287 is closed, through conductor 358 to switch blades 360 and 375 of relays 314 and 321 where the circuit ends, thus resistor 357 is left out of circuit when the oil level trend is steady, and the motor 272 is operated at a standard rate necessary to increase the rate of fuel supply to compensate for the low transfer temperature.

When the oil level is rising, relay 321 is closed and resistor 357 is placed in a circuit as follows. From the resistor 357 which is connected to the main line when relay 287 is closed, through conductor 358, conductor 374, switch blade 375 of relay 321, front contact 376, conductor 377, switch blade 378 of relay 237. If the oil level is high, the circuit proceeds through a front contact 386, conductor 387, switch blade 388 which is open, back contact 407, conductor 408, conductor 368, to that side of the armature 273 to which conductor 274 is connected. If the relay 237 is open due to a low or normal oil level, the circuit proceeds from the switch blade 378 through back contact 379, conductor 380, switch blade 381 of relay 336 which is closed, front contact 411, conductor 412, conductor 373, conductor 368, to the same point in the motor circuit, thus with a rising oil level trend and a low transfer temperature the resistor 357 is placed in the motor circuit in parallel with the resistor 275 to operate the motor 272 rapidly in a direction determined by the low transfer line temperature, that is, to increase the fuel supply rapidly.

It will be observed from the foregoing description of the control circuit of Fig. 2, that the transfer line temperature is effective in regulating the fuel supply by virtue of adjusting the high and low switches of the transfer line temperature controller in accordance with the trend of transfer line temperature. The transfer line temperature is effective in regulating the fuel supply to the furnace according to the off-normal condition of the transfer line so as to compensate for such off-normal condition. The oil level trend and status are effective to regulate the rate at which the fuel supply is regulated and when the transfer line temperature is normal the oil level trend is effective not only to regulate the rate of fuel adjustment but also to determine the direction of change in the rate of fuel supply in anticipation of the effect of the oil level trend upon transfer line temperature. Simultaneously the oil level operates through oil level controller to regulate the supply of hot oil to the cracking still in accordance with the rate of change or trend of the oil level in a manner to prevent such changes, thereby stabilizing the feed of oil and also operates in accordance with the status of the oil level to tend to maintain the oil level at a predetermined normal, the regulation of the rate of oil feed to the cracking still being effective to compensate for variations of oil level from normal. The furnace pyrometer controller operates according to the trend of furnace temperature to tend to maintain a steady trend. The operation of the furnace temperature controller in accordance with furnace temperature trend is such as to cause the rate of fuel supply to the furnace to be effective to the extent and in the direction which the operation of the transfer line temperature controller and the oil level controller tend to produce changes in the fuel supply. This last mentioned control effect takes place by virtue of the fact that the control action of the transfer line temperature controller and the oil level controller in regulating the motor 272 for adjusting the fuel supply, takes place only when the furnace pyrometer controller makes neutral contact, and when the furnace temperature controller departs from neutral contact and makes a contact in accordance with the falling or rising temperature trend or with the enforced change of fuel supply relative to the furnace temperature trend, the furnace temperature controller operates to adjust the motor 272 and also the step table in a manner such as to bring the neutral step of the furnace pyrometer controller in cooperative relation with the pointer, that is, if the furnace temperature overshoots or undershoots the temperature trend which it should follow in accordance with the regulating effects of the transfer line temperature controller and the oil level controller, the furnace temperature controller will operate to cause adjustment of the fuel supply such as to enforce the furnace temperature trend in accordance with that which the transfer line temperature controller and the oil level controller tend to maintain.

The control system represented in Fig. 2 has the basic characteristic that the status of the transfer line temperature determines the direction of correction of the rate of fuel supply, the oil level trend being used to modify the rate according to its anticipated effect upon the transfer line temperature. The operation of the tube still in accordance with the mode of operation of the control system of Fig. 2, is based upon the assumption that the furnace temperature produces changes in transfer line temperature more quickly and more proximately than do changes in the rate of oil feed through the cracking still. Such is not necessarily the case due to the fact that a change in the rate of oil feed through the cracking still is effective throughout the tubes within the still almost immediately. Thus the changes in oil level in the tower, which result in changes in the rate of oil feed through the cracking still, may affect the transfer line temperature more quickly and more strongly than changes in furnace temperature. Of course the heating characteristics of the furnace and the operating characteristics of the dephlegmator tower play a part in determining the relation between the effects of furnace temperature variations and oil level variations upon the transfer line temperature.

The control system of Fig. 3 is designed to operate upon the basis that the changes in oil level in the dephlegmator tower and consequent changes in oil feed through the cracking still, are of primary importance and the corrective regulation of the fuel supply is determined primarily in accordance with the oil level trend, the status of the transfer line temperature being used to modify that regulation.

The apparatus shown diagrammatically in Fig. 3 comprises control instruments operated by a transmitter 413 and thermo-couples 13 and 17 which may be similar in type and general performance to the instruments shown in Fig. 2 as operated by the transmitter 140 and the thermo-couples 13 and 17, respectively.

In Fig. 3, the inductance bridge transmitter 413 transmits to the bridge receiver 414, the variations in oil level in the bottom of the dephlegmator tower as measured by an instrument such as shown in Fig. 10 of the drawings. A pointer 415 cooperates with a step table such as before described, to effect actuation of contacts 416 with contacts 417, 418, and 419, motor 420 being provided to drive the control mechanism to the oil level controller. Operation of contacts 416 and 417 completes a circuit from the main line through conductor 421, conductor 422, contacts 416 and 417, conductor 423, coil 424 of relay 425, conductors 426 and 427, to the opposite side of the main line, thereby actuating relay 420. Engagement of contacts 416 and 418 closes a circuit from the main line through conductors 421 and 422, contacts 416 and 418, conductor 428, coil 429 of relay 430, conductors 431 and 427, to the opposite side of the main line, thereby completing a circuit to actuate relay 430. Actuation of contacts 416 and 419 completes a circuit from the main line, through conductors 421 and 422, contacts 416 and 419, conductor 432, coil 433 of relay 434, conductors 435 and 427, to the other side of the main line, thereby actuating relay 434. The relay 430 remains open when contacts 417 and 419 are engaged. When contacts 417 and 419 are engaged to actuate relays 425 and 434 respectively, parallel circuits are completed as follows. From conductor 423 through field 436, and from conductor 432 through field 437, through common conductor 438, back contact 439 of relay 430, switch blade 440, conductors 431 and 427, to the main line. Fields 433 and 437 are the fields of a reversible motor such as motor 111 of the controller hereinbefore described. The operation of the motor 436—437, when either of the contacts 417 or 419 are engaged, acts to drive the step table in the direction of deflection of the pointer so that the actuation of contacts 417, 418, and 419 is in accordance with the rate of change and direction of change of the oil level, and the control effects provided by the operation of such contacts are such as to oppose changes in the oil level and thereby provide a stabilizing control. The operation of motor 436—437 also tilts mercury switches 441 and 442 according to the up-scale or down-scale position of the step table and pointer. Thus one or the other of mercury switches 441 or 442 is made according as the oil level is low or high respectively. When both switches 441 and 442 open, the oil level is normal.

The control action of the oil level controller upon the rate of hot oil feed through the cracking still, is effected as follows. When the oil level is falling, which causes the actuation of contacts 416 and 417 to energize relay 425, a circuit is completed from the main line through conductor 421, switch blade 443 of relay 425, front contact 444, conductor 445, field 446 of motor 447, armature 448, conductor 449, resistor 450, conductors 451 and 427, to the other side of the main line, thus operating the motor 447 in a direction to decrease the rate of oil feed through the cracking still thereby tending to stop the falling trend of the oil level. The rate at which the motor 447 operates is determined by the adjustment of the resistor 450. When the oil level is rising with a consequent actuation of contacts 416 and 419, and energization of relay 434, a motor operating circuit is completed as follows. From the main line through conductor 421, switch blade 452 of relay 434, front contact 453, conductor 454, field 455 of motor 447, armature 448, conductor 449, resistor 450, conductors 451 and 427, to the opposite side of the main line, thereby operating the motor 447 in a direction to increase the rate of oil feed through the cracking still which tends to stop the rising trend of oil level in the dephlegmator tower.

When the oil level trend stabilizes, the center step of the step engages the pointer thereby actuating contacts 416 and 418 and energizing relay 430 to complete a circuit as follows. From the main line through conductor 421, switch blade 456 of relay 430, front contact 457, conductor 458. From conductor 458 the circuit proceeds according to which of the mercury switches 441 and 442 is in contact making position, or if neither is in contact making position the circuit is incompleted. If the oil level is low, the circuit proceeds from mercury switch 441, through conductor 459, conductor 423, coil 424 of relay 425, conductors 426 and 427, to the other side of the main line, thus energizing relay 425. If the oil level in the dephlegmator be high, the circuit proceeds from mercury switch 442, through conductors 460 and 432, coil 433 of relay 434, conductors 435 and 427, to the other side of the main line. Thus if the oil level is steady and high, relays 430 and 434 are intermittently and simultaneously closed; and if the oil level is steady and low, relays 425 and 430 are intermittently and simultaneously closed. The actuation of relay 425 corresponding to a low oil level, operates the motor 447 to decrease the rate of oil feed through the cracking still, thereby tending to compensate for the low oil level. Likewise, when the oil level is high, the relay 434 operates the motor 447 to increase the oil feed through the cracking still thereby tending to compensate for the high oil level. Inasmuch as it is not necessary to maintain the oil level accurately in normal position at all times, the rate of correction of oil feed to compensate for the off-normal condition of oil level need not be so great as the rate of regulation to oppose a rising or falling trend in oil. Accordingly, the motor 447 is operated by mercury switches 441 or 442 and is operated at a reduced rate by virtue of a circuit from a point intermediate the field and armature of the motor 447, through conductor 461, resistors 462, conductor 463, front contact 464 of relay 430 which is closed, switch blade 440, conductors 431 and 427, to the same side of the main line to which resistor 450 is connected, thus resistors 462 are shunted across armature 448 and resistor 450 to reduce the speed of operation of the motor 447.

From the above description it will be observed that the motor 447 is operated to regulate the oil feed through the cracking still to stabilize the trend of oil level and to compensate for an off-normal condition of the oil level. The status of the oil level is not regarded as important in making adjustments in the regulator for the fuel feed to the furnace to maintain the transfer line temperature. However, the trend of the liquid level does affect the transfer line temperature proximately to a large degree and therefore should be taken into consideration in regulating the fuel feed to the furnace. A falling trend of the liquid level is made effective for regulating the fuel feed as follows. When the relay 425 is energized, a circuit is completed from the main line, through conductor 421, switch blade 465, front contact 466, conductor 467, coils 468 and 469 of relays 470 and 471 respectively, common conductor 472, back contact 439 of relay 430 which is open when the oil level trend is other than steady, through switch blade 440, conductors 431 and 427, to the other side of the main line, thus energizing relays 470 and 471 in accordance with the falling oil level trend. It will be observed that the relay 430 must be open in order to complete the last described circuit and therefore the operation of the mercury switches 441 and 442 when relay 430 is energized along with either relay 425 or 434, cannot complete the last described circuit, so that the status of the oil level is ineffective in controlling the fuel supply to the furnace.

In a similar manner, when due to a rising oil level trend relay 434 is energized, a circuit is completed from the main line through conductor 421, switch blade 473, front contact 474 of relay 434, conductor 475, coils 476 and 477 of relays 478 and 479 respectively, common conductor 472, back contact 439, switch blade 440 of relay 430 which is closed, conductors 431 and 427, to the other side of the main line. Thus relays 478 and 479 are energized in accordance with a rising oil level trend. Holding circuits for relays 470 and 478 are provided as follows. From relay coil 468 of closed relay 470, through conductor 467, front contact 480, switch blade 481 of relay 470, conductor 482, switch blade 483 of relay 478 which is open, back contact 484, conductors 485 and 421, to the main line. When relay 478 is closed a holding circuit proceeds from the coil 476 of closed relay 478, through conductor 475, front conductor 486 and switch blade 483 of relay 478, conductor 482, switch blade 481 and back contact 487 of relay 470, conductors 485 and 421, to the main line. It will be observed that the opposite sides of coils 468 and 476 are connected to the opposite side of the main line through conductor 472, back contact 439 and switch blade 440 of relay 430, conductors 431 and 427, so that the holding circuit is broken by energization of relay 430.

Relays 471 and 479 are energized when relays 425 and 434, respectively, are energized.

Transfer line temperature is measured by the thermocouple 13 represented diagrammatically in Fig. 3, causing pyrometer pointer 488 to deflect in accordance with transfer line temperature. Contacts 489, 490, 491, and 492 are provided to be actuated in accordance with the trend of transfer line temperature in a manner hereinbefore described. The reversible motor 493—494 is energized when contacts 490 and 492, respectively, are engaged to drive the step table in a direction to follow the pointer, a circuit for the reversible motor being completed from one side of the main line through conductor 523, contact 489, contact 490 or 492, field 493 or 494, conductor 495, and conductor 518 back to the other side of the main line. The reversible motor 493—494 is connected to switches 496 and 497 and operates to tilt the same according as the pointer 488 and the table for actuating contacts 490 and 492 moves up or down-scale, switch 496 making contact when the transfer line temperature is down-scale from normal, and switch 497 making contact when the transfer line temperature is up-scale from normal, neither of the mercury switches making contact when the transfer line temperature is normal. The trend of transfer line temperature is effective to control fuel supply to the furnace by virtue of tilting mercury switches 496 and 497 according to the trend of transfer line temperature, that is, a falling transfer line temperature causes actuation of contacts 489 and 490 to energize field 493 of the reversible motor which operates to tilt mercury switches 496 and 497 in a direction tending to make contact in switch 496 and break contact in switch 497. Likewise, when the transfer line temperature is rising, contacts 489 and 492 are actuated to energize field 494 of the reversible motor, thereby operating the mercury switches 496 and 497 in a direction to make contact in switch 497 and to break contact in switch 496. Consequent control actions are effected through the mercury switches. The transfer line temperature trend and the oil level trend produce effects upon the transfer line temperature status and should be considered together; however, a rising or falling trend of transfer line temperature has a predominate effect and produces its control action through mercury switches 496 and 497 independent of oil level trend.

However, when the transfer line temperature trend is steady, the oil level trend should be effective in regulating the fuel in accordance with the anticipated effect of oil level trend upon transfer line temperature trend. A falling oil level trend results in a decrease of oil feed through the cracking still which tends to produce a rising trend of transfer line temperature and accordingly it is desirable to tilt the mercury switches 496 and 497 as if the transfer line temperature were rising. The circuit for so operating the mercury switches proceeds as follows. From the main line through the center contacts 489 and 491 of the transfer line temperature controller, conductor 498, switch blade 499 of relay 471 which is closed intermittently by virtue of the falling oil level trend, front contact 500, conductor 501, field 494, conductor 495, and conductor 523 to the main line. Thus a steady transfer line temperature and falling oil level trend operate reversible motor 493—494 to tilt the mercury switches 496 and 497 in anticipation of, and as on the occurrence of a rise in transfer line temperature. Conversely, with a steady transfer line temperature and a falling trend of oil level, the circuit proceeds from the main line through the center contacts 489 and 491 of the transfer temperature controller, conductor 498, switch blade 502 of relay 479 which is closed intermittently due to the rising oil level, front contact 503, conductor 504, field 493, conductor 495, and conductor 523 to the main line. Thus a steady transfer line temperature and a rising oil level trend operate the motor 493—494 to tilt the mercury switches 496—497 in anticipation of, and as on the occurrence of a consequent falling transfer line temperature. Operation of the reversible motor 493—494 in accordance with the oil level trend when the transfer line temperature is steady, also operates to shift the table of the transfer line temperature controller, that is, with a rising oil level which results in a change in hot oil feed tending to reduce the transfer line temperature, the reversible motor 493—494 operates as if the transfer line temperature were falling and accordingly shifts the table down-scale. Conversely, when the oil level is falling, the operation of the reversible motor 493—494 in anticipation of the change of transfer line temperature moves the step table for the transfer temperature controller up-scale.

The status of the transfer line temperature as measured by the position of switches 496 and 497 together with the anticipated effects of transfer line temperature trend and oil level trend upon the position of those switches, are made effective in controlling the fuel supply through circuits as follows. From the main line through conductor 523, conductor 505, switch 496 when closed, conductor 506, coil 507 of relay 508, conductor 509, and conductor 518 back to the main line, thus energizing relay 508 and holding it closed so long as the mercury switch 496 is closed, that is, so long as the status of the transfer line temperature together with the anticipated effects upon the transfer line temperature status of the transfer line temperature trend and the oil level trend, produces a control condition corresponding to or tending to produce a low transfer line temperature. Conversely, when the transfer line temperature is high, or the composite of transfer line temperature and anticipated effect of the trends of the transfer line temperature and the oil level causes the mercury switch 497 to be closed, a circuit proceeds from the main line through conductor 523, conductor 505, switch 497, conductor 510, relay coil 511 of relay 512, and conductor 518 back to the main line. So long as mercury switch 497 remains closed, relay 512 remains closed.

Furnace temperature as measured by the thermocouple 17, represented diagrammatically in Fig. 3, operates the pyrometer pointer 512' in accordance with the furnace temperature. The pointer 512 cooperates with a step table such as hereinbefore described to actuate contacts 513, 514, 515, and 516, the step table being moved by a reversible motor to follow the pointer so that the actuations of contacts 514, 515, and 516, respectively, are made in accordance with a falling, steady, or rising trend of furnace temperature. The control mechanism is driven by motor 517. When contacts 513 and 514 are made, a relay energizing circuit is completed from the main line, through conductor 518, coil 519 of relay 520, conductor 521, contacts 514 and 513, conductors 522 and 523, to the opposite side of the main line. When contacts 513 and 515 are made, the circuit proceeds from the main line through conductors 523 and 522, contacts 513 and 515, conductor 524, coil 525 of relay 526, conductors 527 and 518, to the other side of the main line. When contacts 513 and 516 are made, a relay energizing circuit is completed from the main line through conductors 522 and 523, contacts 513 and 516, conductor 528, coil 529 of relay 530, conductors 531 and 518, to the other side of the main line.

Energization of relay 520 makes a circuit from the main line through conductor 523, switch blade 532 and front contact 533 of closed relay 520, conductor 534, to field 535 of the reversible table driving motor. Likewise, energization of relay 530 completes a circuit from the main line through conductor 523, switch blade 536 and front contact 537 of relay 530, conductor 538, to field 539 of the reversible motor. The circuit from the reversible motor is completed through common lead 540, back contact 541 and switch blade 542 of relay 526 when the latter is closed, conductors 527 and 518, to the opposite side of the main line, thus a reversible motor 535—539 is operated when and only when contact 514 or 516 is made so as to drive the table in the direction of the deflection of pointer 512. Mercury switches 543 are tilted by operation of motor 535—539 and operate, through obvious circuits, the signal lights 544 to indicate whether the furnace temperature is at, above, or below a predetermined temperature.

The furnace pyrometer controller operates, through contacts 514 and 516, relays 520 and 530 to regulate the fuel supply to the furnace in a manner to stabilize the furnace temperature, that is, to oppose a rising or falling temperature trend. A circuit for operating the fuel regulating motor when the furnace temperature is falling, proceeds from the main line through conductor 523, switch blade 545 of relay 520 which is closed intermittently, front contact 546, conductor 547, field 548, armature 549 of motor 550, conductors 551, 552, and 553, resistor 554, conductors 555 and 518, to the main line. Operation of the motor 550 through field 548, regulates the fuel supply to increase the rate of fuel supply. The rate at which motor 550 operates, is determined by the adjustment of resistor 554. In a similar manner, when the furnace temperature is rising, the circuit proceeds from the main line through conductor 523, switch blade 556 of relay 530 which is intermittently closed, front contact 557, conductor 558, field 559 of the motor 550, armature 549, conductors 551, 552 and 553, resistor 554, conductors 555 and 518, to the main line. A rising temperature trend operates the motor 550 through field 559 to decrease the fuel supply. The operation of the furnace temperature controller to regulate the fuel supply so as to oppose a rising and falling temperature trend and thereby stabilize the furnace temperature, is independent of the other operations of the control system. When the furnace temperature trend stabilizes, the center contact 515 of the furnace temperature controller is made, thereby energizing relay 526 which makes possible the operation of motor 550 to regulate the fuel supply in accordance with transfer line temperature and oil level conditions. With the furnace temperature trend steady, the oil level trend and the transfer line trend and the transfer line temperature status operate through mercury switches 496 and 497 to operate the motor 550 and thereby operate the fuel supply, and at the same time the oil level trend operates directly to regulate the fuel supply through motor 550.

A falling oil level results in a rapid decrease in oil feed through the cracking still with a consequent tendency for a rapid increase in transfer temperature. A falling oil level combined with a high transfer temperature makes necessary a reduction of the rate of fuel supply rapidly in order to correct not only for the high transfer temperature but also for the tendency of it to rise further because of the reduction in oil feed through the still. With a falling oil level relay 470 is maintained in an energized condition and relay 471 is energized intermittently. When the transfer temperature is high relay 512 is maintained in closed position. When the relay 526 is energized intermittently, due to a steady furnace temperature trend, circuits for operating the motor 550 are completed as follows. From the main line through conductor 523, armature 560 of relay 526, front contact 561, conductor 562, armature 563 of relay 471, front contact 564, conductor 565, coil 529 of relay 530, conductors 531 and 518, to the main line, thereby energizing relay 530 which completes a circuit for motor 550, through field 559, to operate that motor in a direction to decrease the fuel supply. Simultaneously a circuit is completed from conductor 551, through conductor 566, front contact 567 and armature 568 of relay 512, conductor 569, armature 570, front contact 571 of relay 470, conductor 572, resistor 573 and conductor 574, front contact 575 and armature 542 of relay 526, conductors 527 and 518, to the same side of the main line to which resistor 555 is connected. Thus resistors 573 and 554 are placed in parallel to increase the current flow through the motor and speed up the rate of operation so that the rate of fuel supply is decreased rapidly.

With a falling oil level it is desirable, as before pointed out, to decrease the fuel supply in anticipation of an increase in transfer line temperature, and when the transfer line temperature is normal, it is desirable to decrease the fuel supply slowly so with a falling oil level and normal transfer line temperature, relay 470 is held and relay 471 is actuated intermittently and both relays 508 and 512 are open. A circuit proceeds through relays 526 and 471 to actuate relay 530 which in turn operates motor 550, through armature 559, as before described. At the same time a circuit is completed from a point in the motor intermediate the fields and armature, through conductor 576, back contact 577 of relay 512, armature 568, conductor 569, armature 570 and front contact 571 of relay 470, conductor 572, resistors 573, conductor 574, front contact 575 and switch blade 542 of relay 526, conductors 527 and 518, to that side of the main line to which resistor 554 is connected. Thus resistors 573 are shunted across the armature 549 and resistor 554, thereby reducing the speed of operation of the motor 550 so that the motor 550 operates to decrease the rate of fuel supply slowly.

When the oil level trend is falling and the transfer line temperature is low, the same conditions prevail as in the case when the transfer line temperature is normal and the oil level is falling and the circuits for operating the motor 550 proceed as described in the last mentioned case. Relay 508 which is energized under such circumstances does not modify the operation of motor 550.

When the oil level trend is stationary, the regulation of the rate of fuel feed is effected by mercury switches 496 and 497 alone except for the operation of the furnace temperature controller, that is, by the transfer line temperature status and also by the effect on the position the mercury switches 496 and 497 produced by the control effects of the transfer line temperature trend and oil level trend. When the transfer line temperature is high, relay 512 is closed and the circuit proceeds from the main line, through conductor 523, switch blade 560 and front contact 561 of relay 526 when actuated, conductor 562, switch blade 578, back contact 579 of relay 479, conductor 580, switch blade 581 of relay 512, front contact 582, conductor 565, coil 529 of relay 530, conductors 531 and 518, to the main line, thus energizing relay 530 which operates to drive motor 550 through field 559 in a direction to decrease the rate of supply of fuel. Inasmuch as both relays 470 and 478 are open, the circuit from conductor 512 for resistor 573 is open and therefore that resistor is left out of the circuit and the motor 550 operates at a standard rate which is intermediate the rates at which that motor is operated if resistor 573 is placed in circuit for decreasing or increasing the speed of the motor.

When the transfer line temperature is normal together with a steady oil level trend, all of relays 470, 471, 478, 479, 508, and 512 are open and the circuit which proceeds through conductor 562 for energizing either of the relays 520 or 530, is open, so that motor 550 is not operated by the transfer line temperature controller and/or oil level controller.

With a steady oil level trend and a low transfer line temperature, relay 508 is closed and the relay energizing circuit from the main line through armature 560 of relay 526 proceeds through conductor 562, armature 563 of relay 471, back contact 583, conductor 584, armature 585 of relay 508, front contact 586, conductor 587, coil 519 of relay 520, conductor 518, to the main line, thus energizing relay 520 which in turn operates motor 550 through field 548 to increase the rate of fuel supply to the furnace. The motor 550 operates at the standard rate inasmuch as both relays 470 and 478 are open.

A rising oil level trend operates rapidly to increase the rate of oil feed through the cracking still which tends to reduce the transfer line temperature. When the transfer temperature is high or normal, it is desirable to decrease the rate of fuel supply slowly in anticipation of a fall in transfer line temperature. Circuits for so operating the motor 550 proceed from the main line through the armature 560 of relay 526 when closed, through conductor 562, armature 578 and front contact 588 of closed relay 479, conductor 587, coil 519 of relay 520, conductor 518, to the main line, thereby energizing relay 520 intermittently to operate the motor 550 through field 548 in a direction to increase the fuel supply. Simultaneously a circuit is completed from a point intermediate of the field and the armature of the motor 550, through conductor 576, conductor 589, back contact 590 and switch blade 591 of relay 508, conductor 592, switch blade 593, front contact 594 of closed relay 478, conductor 572, resistors 573, conductor 574, front contact 575 of closed relay 526, armature 542, conductors 527 and 518, to that side of the main line to which resistor 554 is connected, thus resistors 573 are shunted across the armature 549 and resistor 554 of the motor 550 so as to reduce the rate of operation of the motor. Thus the fuel supply is increased slowly when the oil level trend is rising and the transfer line temperature is high or normal. It will be observed that the circuit for resistors 573 proceeds independently of relay 512 and therefore, that relay may be either in or out so long as relay 508 is out, which corresponds either to a high or normal transfer line temperature.

When the oil level trend is rising and the transfer line temperature is low, the fuel supply must be regulated not only to anticipate a decrease in transfer line temperature, but also to compensate for the already low transfer line temperature, and therefore it is desirable to increase the fuel supply rapidly. The circuit for operating the motor 550 through field 548 to increase the fuel supply, is completed as before described. The circuit for the resistor 573 proceeds from the armature 549, through conductor 551, conductor 552, conductor 595, front contact 596 of closed relay 508, armature 591, conductor 592, armature 593 and front contact 394 of closed relay 498, conductor 572, resistors 573, conductor 574, front contact 515 and armature 542 of closed relay 526, conductors 527 and 518, to that side of the main line to which resistor 554 is connected. Thus resistors 573 and 554 are placed in parallel and the motor 550 operates rapidly to increase the fuel supply.

It will be observed that in the operation of the control circuit of Fig. 3, the various controllers must operate to make contacts at the same time in order that relays which are intermittently actuated, will be energized at the same time. Such effect may be obtained by synchronizing the operation of the controllers as to rate and cycle: for example, all three controllers may be driven from the same motor.

While the operation of motor 550 in accordance with the transfer line temperature and oil level in the dephlegmator proceeds as last described, the oil level controller operates at the same time to regulate the oil feed through the cracking still through motor 447, as before described. When the furnace temperature trend departs from a steady condition, the motor 550 is operated solely by the furnace temperature trend to enforce the furnace temperature trend in accordance with that which the transfer line temperature controller and the oil level controller tend to maintain.

From the foregoing description it will be apparent that this invention provides for the control of a tube still, or more generally, of a processing apparatus in which there is a plurality of regulatable conditions and a plurality of conditions to be controlled, which control system and method operates in accordance with the status and trends of at least some of the measured conditions to vary the regulatable conditions in a manner such as to maintain at least some of the measured conditions to a predetermined status and to stabilize them against trends, the control system and method being effective in its operation to anticipate the effects both of accidental and of regulated changes in the various interrelated conditions, both regulated and measured.

While the invention has been described in connection with particular forms of apparatus by way of illustration, it will be apparent that the invention is not so limited. For instance, the pyrometer controllers and the oil level controller may be such as to operate continuously rather than intermittently. Such controllers may operate upon a potentiometric measuring system rather than a direct measuring system. The circuit connections and type and number of relays may be varied as will be apparent to one skilled in the art, in order to obtain the desired mode of operation. While the invention has been applied to the automatic control of a tube still in which at least part of the oil feed through the cracking still is taken from the dephlegmator tower, it will be obvious that the control system broadly can be applied to other apparatus for carrying out industrial processes: for example, to a furnace for heat treating metal objects fed continuously therethrough.

The invention having been described by way of illustration, what I now claim as my invention, is as follows:

1. An automatic control system for oil cracking units comprising a cracking still and dephlegmator from which oil is fed through the cracking still, having, in combination, a regulator for varying the supply of heat to the still, control means responsive to and operating in accordance with the trend of the oil level in the dephlegmator for actuating said regulator.

2. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend of oil level in the dephlegmator and the status of the temperature in the first mentioned connection for actuating said regulator.

3. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the oil level in the dephlegmator and the trend of the temperature in the first mentioned connection for actuating said regulator.

4. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend of oil level in the dephlegmator, the status and trend of the temperature in the first mentioned connection and the heating means temperature trend for actuating said regulator.

5. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend of oil level in the dephlegmator, the status of the temperature in the first mentioned connection and the trend of the heating means temperature for actuating said regulator.

6. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend of oil level in the dephlegmator and the trend of the temperature in the first mentioned connection for actuating said regulator.

7. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend of oil level in the dephlegmator, the trend of the temperature in the first mentioned connection and the trend of the heating means temperature for actuating said regulator.

8. An automatic control system for oil cracking units comprising a cracking still and dephlegmator from which oil is fed through the cracking still, having, in combination, a regulator for varying the supply of heat to the still, control means responsive to and operating in accordance with the status of the oil level in the dephlegmator for actuating said regulator.

9. An automatic control system for oil cracking units comprising a cracking still and dephlegmator from which oil is fed through the cracking still, having, in combination, a regulator for varying the supply of heat to the still, control means responsive to and operating in accordance with the trend and status of oil level in the dephlegmator for actuating said regulator.

10. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend and status of oil level in the dephlegmator and the status of the temperature in the first mentioned connection for actuating said regulator.

11. An automatic control system for an oil cracking unit comprising a dephlegmator and a cracking still including heating means and an oil container, a connection between the dephlegmator and container through which oil in the container passes into the dephlegmator and a second connection through which oil is fed from the dephlegmator into said container, having in combination, a regulator for the supply of heat to said heating means and control means responsive to and cooperating in accordance with the trend and status of oil level in the dephlegmator, the status of the temperature in the first mentioned connection for actuating said regulator, and the trend of heating means temperature, for actuating said regulator.

12. An automatic control system for oil cracking units comprising a cracking still and dephlegmator from which oil is fed through the cracking still, having, in combination, a regulator for varying the supply of heat to the still, control means responsive to and operating in accordance with the trend of the oil level in the dephlegmator for actuating said regulator, control means operating in acordance with the trend and status of the oil level in the dephlegmator for regulating the oil feed through the cracking still.

13. An automatic control system for an oil cracking unit comprising a dephlegmator and a cracking still including heating means and an oil container, a connection between the dephlegmator and the container through which oil in container passes into the dephlegmator, and a second connection through which oil is fed from the dephlegmator into said container, having in combination, a regulator for the supply of heat to said heating means, control means responsive to and operating in accordance with the trend of the oil level in the dephlegmator and the status of the temperature in the first mentioned connection for actuating said regulator, and control means responsive to and operating in accordance with the trend and the status of the oil level in the dephlegmator for regulating the oil feed into said container through said second connection.

14. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend of the oil level in the dephlegmator and the status and trend of the temperature in the first mentioned connection for actuating said regulator, and control means responsive to and operating in accordance with the trend and the status of the oil level in the dephlegmator for regulating the oil feed into said container through said second connection.

15. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend of the oil level in the dephlegmator, the status and trend of the temperature in the first mentioned connection and the trend of the heating means temperature for actuating said regulator, and control means responsive to and operating in accordance with the trend and the status of the oil level in the dephlegmator for regulating the oil feed into said container through said second connection.

16. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend of the oil level in the dephlegmator, the status of the temperature in the first mentioned connection and the trend of the heating means temperature for actuating said regulator, and control means responsive to and operating in accordance with the trend and the status of the oil level in the dephlegmator for regulating the oil feed into said container through said second connection.

17. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend of the oil level in the dephlegmator and the trend of the temperature in the first mentioned connection for actuating said regulator, and control means responsive to and operating in accordance with the trend and the status of the oil level in the dephlegmator for regulating the oil feed into said container through said second connection.

18. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend of the oil level in the dephlegmator, the trend of the temperature in the first mentioned connection and the trend of the heating means temperature for actuating said regulator, and control means responsive to and operating in accordance with the trend and the status of the oil level in the dephlegmator for regulating the oil feed into said container through said second connection.

19. An automatic control system for oil cracking units comprising a cracking still and dephlegmator from which oil is fed through the cracking still, having, in combination, a regulator for varying the supply of heat to the still, control means responsive to and operating in accordance with the status of the oil level in the dephlegmator for actuating said regulator, control means operating in accordance with the trend and status of the oil level in the dephlegmator for regulating the oil feed through the cracking still.

20. An automatic control system for oil cracking units comprising a cracking still and dephlegmator from which oil is fed through the cracking still, having, in combination, a regulator for varying the supply of heat to the still, control means responsive to and operating in accordance with the trend and status of oil level in the dephlegmator for actuating said regulator, control means operating in accordance with the trend and status of the oil level in the dephlegmator for regulating the oil feed through the cracking still.

21. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend and status of the oil level in the dephlegmator and the status of the temperature in the first mentioned connection for actuating said regulator, and control means responsive to and operating in accordance with the trend and status of the oil level in the dephlegmator for regulating the oil feed into said container through said second connection.

22. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a regulator for the supply of heat to said heating means, control means responsive to and operating in accordance with the trend and status of the oil level in the dephlegmator, the status of the temperature in the first mentioned connection and the trend of the temperature of the heating means for actuating said regulator, and control means responsive to and operating in accordance with the trend and status of the oil level in the dephlegmator for regulating the oil feed into said container through said second connection.

23. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination a fuel regulator for the supply of heat to said heating means, an oil regulator regulating the oil feed into said container through said second connection, control means responsive to and operating in accordance with the trend and status of the oil level in the dephlegmator, the status and trend of the temperature in the first mentioned connection and to the trend of the heating means temperature for actuating said fuel regulator, and control means responsive to and operating in accordance with the trend and status of the oil level in the dephlegmator for actuating said oil feed regulator.

24. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a fuel regulator for the supply of heat to said heating means, an oil regulator for varying the oil feed to said container through said second connection, control means responsive to and operating in primary accordance with the trend of the oil level in the dephlegmator and in secondary accordance with the trend and status of the temperature in the first mentioned connection and the trend of the heating means temperature for actuating said fuel regulator, and control means responsive to and operating in accordance with the trend and status of the oil level in the dephlegmator for operating the oil regulator.

25. An automatic control system for an oil cracking unit comprising a dephlegmator and a cracking still including heating means and an oil container, a connection between the dephlegmator and the container through which oil in the dephlegmator, and a second connection through which oil is fed from the dephlegmator into said container, having in combination, a regulator for the supply of heat to said heating means, an oil regulator for regulating the oil feed into said container through said second connection, control means responsive to and operating in accordance with the trend of the oil level in the dephlegmator, the status and trend of the temperature in the first mentioned connection and the heating means temperature trend for subjecting said fuel feed regulator to control actions primarily dependent on the status of the temperature in the first mentioned connection for actuating said regulator, and control means responsive to and operating in accordance with the trend and status of the oil level in the dephlegmator for actuating said oil regulator.

26. An automatic control system for processing apparatus involving a plurality of regulatable conditions, and at least one first variable condition proximately related to the regulatable conditions collectively; which comprises, in combination, regulators for adjusting the regulatable conditions, devices responsive to changes in second variable conditions proximately and selectively related to said regulatable conditions, an instrument responsive to said first variable condition, control means associating said regulators and devices and instrument for operating the regulators to maintain said first variable condition according to predetermined schedule and to allot the regulating action according to the tendencies of the regulatable conditions to affect the system.

27. An automatic control system for a processing apparatus having a plurality of regulatable conditions and at least one master variable to be maintained in a predetermined schedule comprising, in combination, means responsive to variations in said variable, means for measuring the operating status of said conditions, regulating means for regulating said conditions, said regulating means being operated by the first mentioned means to maintain said variable to schedule, said control means also being operated by said measuring means to selectively modify the control action for each of said conditions according to the status of the condition.

28. An automatic control system for a processing apparatus having a plurality of regulatable conditions and at least one master variable to be maintained in a predetermined schedule comprising, in combination, means responsive to changes in said variable, means for measuring the operating status of said conditions, regulating means for regulating said conditions, said regulating means being operated by the first mentioned means to maintain said variable to schedule, said regulating means also being operated by said measuring means to selectively modify the regulating action for each of said conditions according to the status of the condition, and according to the anticipated effect of the composite status of the conditions upon the variable.

29. An automatic control system having a first regulator, a second regulator, said regulators adjusting conditions which are causally interdependent, measuring instruments responsive to variations in said conditions, a measuring device responsive to a condition which is causally dependent upon said first mentioned conditions, the measuring action of at least one of said instruments being influenced by changes in the second mentioned condition, automatic control means responsive to the measuring action of said instruments and device for operating said regulators according to the anticipated effect of changes in the second mentioned condition upon the first mentioned conditions.

30. An automatic control system for an oil cracking unit comprising a dephlegmator and a cracking still including heating means and an oil container, a connection between the dephlegmator and the container through which oil in the container passes into the dephlegmator, and a second connection through which oil is fed from the dephlegmator into said container, having in combination, a pyrometer measuring the temperature in the first mentioned connection, a pyrometer measuring the temperature of said heating means, a level gauge measuring the oil level in the dephlegmator, regulating means regulating the heat supply to said heating means, regulating means regulating the oil feed to said container through said second connection, and control system elements interconnecting said pyrometers, gauge and the two regulating means to automatically maintain the temperature in the first connection on a predetermined schedule and to maintain said oil level between predetermined limits.

31. An automatic control system for an oil cracking unit comprising a dephlegmator and a cracking still including heating means and an oil container a connection between the dephlegmator and the container through which oil in the container passes into the dephlegmator, and a second connection through which oil is fed from the dephlegmator into said container, having in combination, a pyrometer measuring the temperature in the first mentioned connection, a pyrometer measuring the temperature of said heating means, a level gauge measuring the oil level in the dephlegmator, regulating means regulating the heat supply to said heating means, regulating means regulating the oil feed to said container through said second connection, and control system elements interconnecting said pyrometers, gauge and the two regulating means to automatically maintain the temperature in the first connection on a predetermined schedule and to maintain said oil level between predetermined limits and including means making the control actions of said regulating means dependent on the trend and status of the heating means temperature and on the trend and status of said oil level.

32. An automatic control system for processing apparatus involving a plurality of variable conditions and a plurality of regulatable conditions, said conditions being interrelated, which comprises, in combination, devices for measuring the variable conditions, regulators for adjusting the regulatable conditions, and means associating the devices and the regulators for effecting regulation of the regulatable conditions so as to maintain one or more of the variable conditions within predetermined limits and for adjusting the control action for each control in accordance with its tendency to affect the variable condition.

33. An automatic control system for a processing apparatus having a plurality of regulatable conditions, variables proximately related to each condition, and at least one ultimate variable proximately related to the combined conditions, having in combination, measuring devices responsive to each of said variables, regulators for adjusting said regulatable conditions, means operating according to the ultimate variable for adjusting said conditions, means operating according to the variables proximately related to each condition for distributing the regulating effect among the regulatable conditions according to the relation between the last mentioned variables and the utimate variable.

34. An automatic control system for processing apparatus having at least one master variable which is to be maintained in a predetermined schedule and a plurality of regulatable conditions adjustable to maintain said master variable comprising, in combination, means for measuring said master variable, devices for measuring process variables which are selectively related to said regulatable conditions, regulators for adjusting said regulatable conditions, means associating said first means, devices, and regulators for operating the regulators to maintain said master variable in predetermined schedule and for allotting the regulating effect among the various controls in acordance with the status of each regulatable condition as measured by the devices.

35. An automatic control system having a first regulator, a second regulator, said regulators adjusting different conditions, measuring instruments responsive to variations in said conditions, a measuring device responsive to variations in a condition dependent upon the first mentioned conditions, automatic control means operating the regulators according to the measuring action of said device and according to the measuring action of said instruments, the regulation being in accordance with the rate of change of measuring action of at least one of said instruments.

36. An automatic control system having a first regulator, a second regulator, said regulators adjusting different conditions, measuring instruments responsive to changes in said conditions, a measuring device responsive to a condition which is dependent upon the first mentioned conditions, automatic control means for operating said regulators according to the measuring action of said instruments and devices, the regulation being in accordance with the extent, direction, and rate of change of measuring action of at least one of said instruments.

37. An automatic control system having a first regulator, a second regulator, said regulators adjusting different conditions, measuring instruments responsive to changes in said conditions, a measuring device responsive to a condition which is causally dependent upon the first mentioned conditions, automatic control means for operating said regulators according to the measuring action of said instruments and devices, the regulation being in accordance with the extent, direction, and rate of change of measuring action of at least one of said instruments, the degree and distribution of regulation being in accordance with the anticipated effect of changes in said first mentioned conditions upon the second mentioned condition.

38. An automatic control system having a first regulator, a second regulator, said regulators adjusting different conditions, measuring instruments responsive to variations in said conditions, a measuring device responsive to variations in a condition dependent upon the first mentioned conditions, automatic control means operating the regulators according to the measuring action of said device and according to the measuring action of said instruments, the regulation being in accordance with the rate of change of measuring action of at least one of said instruments, the degree and distribution of regulation being in accordance with the anticipated effect of changes in the first mentioned conditions upon the last mentioned conditions.

39. An automatic control system having a first regulator, a second regulator, said regulators adjusting different conditions, measuring instruments responsive to variations in said conditions, a measuring device responsive to a condition causally dependent on said first mentioned conditions, automatic control means for operating said regulators according to the extent, direction, and rate of change of measuring action of said device and instruments.

40. An automatic control system having a first regulator, a second regulator, said regulators adjusting different conditions, measuring instruments responsive to variations in said conditions, a measuring device responsive to a condition causally dependent on said first mentioned conditions, automatic control means for operating said regulators according to the extent, direction, and rate of change of measuring action of said device and instruments, the degree and distribution of regulating effect being in accordance with the anticipated effect of the first mentioned conditions upon the second mentioned condition.

41. An automatic control system having a first regulator, a second regulator, said regulators affecting different conditions which are causally interdependent, instruments responsive to variations of said conditions, automatic control means for operating said regulators, at least one of the regulators being operated according to variations in measuring action of both instruments, the degree of regulation being modified by the anticipated effect of variations in one condition upon the other condition.

42. An automatic control system having a first regulator, a second regulator, said regulators affecting different conditions which are causally interdependent, instruments responsive to variations in said conditions, automatic control means for operating each regulator according to variations of both conditions regulated, the degree and distribution of control action being in accordance with the anticipated effect of variations of one condition upon the other condition.

43. An automatic control system having a first regulator, a second regulator, said regulators affecting different conditions which are causally related, instruments responsive to variations in said conditions, automatic control means for operating each regulator according to the rate of change of both conditions, the degree and distribution of regulation being in accordance with the anticipated effect of variations of one condition upon the other condition.

44. An automatic control system having a first measuring device, a second measuring device, said devices measuring quantities which are causally interdependent, a first regulator, a second regulator, said regulators affecting different conditions, automatic control means operating said regulators according to the variations of said measured quantities, the extent and distribution of the regulating effect being in accordance with the anticipated effect of the variations of each measured quantity upon the other measured quantity.

45. An automatic control system having a first measuring device, a second measuring device, said devices measuring quantities which are causally interdependent, a first regulator, a second regulator, said regulators affecting different conditions, automatic control means for operating each regulator according to the extent, direction, and rate of change of the measuring action of both of the measuring instruments, the distribution and extent of regulation being in accordance with the anticipated effect of the variations of one measured quantity on the other measured quantity.

46. An automatic control system having a first measuring device, a second measuring device, said devices measuring quantities which are causally interdependent, a first regulator, a second regulator, said regulators affecting different conditions, automatic control means for operating said regulators, at least one of the regulators being operated according to measurements of both of said measuring devices, the degree of regulation being modified by the anticipated effect of variations of one measured quantity upon the other measured quantity.

47. The method of controlling a process involving a plurality of variable conditions and a plurality of controllable conditions which are interrelated comprising measuring the variable conditions and automatically adjusting the controllable conditions in accordance with said measurements to maintain at least part of the variable conditions according to schedule, and selectively adjusting each control action according to the tendency of each controllable condition to affect the variable conditions.

48. An automatic control system for an oil cracking unit comprising a dephlegmator and a cracking still including heating means and an oil container, a dephlegmator, a connection between the container and dephlegmator through which oil in the container passes into the dephlegmator, a second connection between the container and dephlegmator through which oil is fed from the dephlegmator into said container, having in combination, a regulator for adjusting the supply of fuel to the furnace, a regulator for the feed of oil through said second connection, a first device responsive to the accumulation of oil in said dephlegmator, a second device responsive to the temperature of the heating means, an instrument responsive to the temperature in the first mentioned connection, and control means associated with said regulators, devices and instrument and giving said regulators adjustments which collectively tend to maintain the last mentioned temperature at a predetermined value and which are in individual correspondence with the respective tendencies of said oil accumulation and said heating means temperature to vary the temperature in the first mentioned connection.

49. An automatic control system for an oil cracking unit comprising an oil receiver and a cracking still including heating means and an oil container, a connection between said receiver and container through which oil heated in the container passes into said receiver and a second connection through which oil is fed from said receiver into said container, having in combination a regulator for the rate of withdrawal of oil fed from said receiver to said container and control means responsive to and operating in accordance with the level of the oil in said receiver and with one or more other measured variable conditions of still operation which affect said level, for operating said regulator.

50. A control system for apparatus for carrying out a process involving a plurality of variable conditions, comprising in combination a plurality of regulators each directly varying a different one of said conditions, a plurality of devices one for and directly responsive to changes in a corresponding one of said conditions, a device responsive to an effect dependent on said conditions, and means cooperating with said devices for subjecting said regulators to adjustments collectively tending to maintain said effect at a predetermined value and varying said conditions relative to one another in compensating accordance with the trend of one or more of said conditions to vary said effect from its predetermined value.

51. Oil refining apparatus comprising a dephlegmator, oil heating means including an enclosed oil receiving space and a regulator adjustable to vary the supply of heat to said space, a connection between said space and dephlegmator through which the latter receives oil vapors resulting from the absorption of heat by the oil in said space, and a second connection through which oil is fed from the dephlegmator into said space, said apparatus having variable conditions of operation including the temperature in said space and the rate of change in said temperature, the oil level in the dephlegmator and the direction and rate of change in said level, and in combination with said apparatus, means separately responsive to two or more of said variable conditions of operation and operative connections through which the last mentioned means jointly control said regulator.

52. An automatic control system comprising in combination a pair of measuring devices separately measuring quantities which are causally interdependent, a regulator controlling one of said quantities and control means through which said regulator is directly adjusted by each of said devices in response to variations in the quantity measured by the latter, and through which the said regulator adjustments effected by one of said devices are modified by the other device in accordance with its response to variations in the quantity measured by the latter.

53. An automatic control system for processing apparatus involving a plurality of variable conditions and a plurality of regulatable conditions, said conditions being interrelated, which comprises in combination devices for separately measuring the variable conditions, regulators for separately adjusting the regulatable conditions, and means associating said devices and regulators through which one of said regulators is directly adjusted by each of said devices in response to a variation in the variable condition measured by the latter, and through which one of said devices modifies the adjusting action of another of said devices on the last mentioned regulator and directly adjusts another of said regulators.

54. An automatic control system for processing apparatus involving a plurality of variable conditions and a plurality of regulatable conditions, said conditions being interrelated, which comprises in combination devices each separately measuring a corresponding one of the variable conditions and having a normal value condition and adapted to produce a control effect dependent on a departure of said device from its normal value condition, regulators for separately adjusting the regulatable conditions, and means associating said devices and regulators through which one of said regulators is directly adjusted by each of said devices in accordance with a control effect of the latter, and through which one of said devices modifies the said normal value condition of another of said devices and directly adjusts another of said regulators.

55. An automatic control system for processing apparatus involving a plurality of variable conditions and a plurality of regulatable conditions, said conditions being interrelated, which comprises in combination devices each separately measuring a corresponding one of the variable conditions and having a normal value condition and adapted to produce a control effect dependent on a departure of said device from its normal value condition, motor means for adjusting one of said devices to vary its said normal value condition, regulators for separately adjusting the regulatable conditions, means associating said devices and regulators through which one of said regulators is directly adjusted by each of said devices in accordance with a control effect of the latter, and through which the said motor means of said one device is actuated by another of said devices and through which the latter directly adjusts another of said regulators.

56. An automatic control system for processing apparatus involving a plurality of variable conditions and a plurality of regulatable conditions, said conditions being interrelated, which comprises in combination devices for separately measuring the variable conditions, regulators for separately adjusting the regulatable conditions, and means associating said devices and regulators through which one of said regulators is directly adjusted by one of said devices in response to a variation in the variable condition measured by the latter, and through which the adjusting action of the last mentioned device on the last mentioned regulator is modified by another of said devices, and through which the latter directly adjusts another of said regulators.

ANKER E. KROGH.